US009727053B2

(12) United States Patent
Ito

(10) Patent No.: US 9,727,053 B2
(45) Date of Patent: Aug. 8, 2017

(54) INFORMATION PROCESSING APPARATUS, CONTROL METHOD FOR INFORMATION PROCESSING APPARATUS, AND RECORDING MEDIUM

(75) Inventor: Yoshinori Ito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/568,595

(22) Filed: Aug. 7, 2012

(65) Prior Publication Data
US 2013/0054025 A1    Feb. 28, 2013

(30) Foreign Application Priority Data

Aug. 26, 2011 (JP) ................................ 2011-185257

(51) Int. Cl.
| G05B 19/04 | (2006.01) |
| G05B 19/42 | (2006.01) |
| B25J 9/16 | (2006.01) |

(52) U.S. Cl.
CPC ............ *G05B 19/42* (2013.01); *B25J 9/1697* (2013.01); *G05B 2219/36492* (2013.01); *G05B 2219/37555* (2013.01); *G05B 2219/39094* (2013.01); *G05B 2219/39484* (2013.01); *G05B 2219/39536* (2013.01); *G05B 2219/39542* (2013.01); *G05B 2219/45064* (2013.01)

(58) Field of Classification Search
CPC ...... B25J 9/0081; B25J 9/1687; B25J 9/1684; B25J 9/163; B25J 19/022; B25J 19/023; B25J 19/04; A61B 19/2203; G05B 2219/40564; G05B 2219/40583

USPC ......... 700/259, 262, 264; 901/3, 4; 414/730; 318/568.14; 702/152, 153
See application file for complete search history.

(56) References Cited

U.S. PATENT DOCUMENTS

| 3,888,362 | A | * | 6/1975 | Fletcher et al. | ............... 414/620 |
| 4,412,293 | A | * | 10/1983 | Kelley et al. | .................. 700/259 |
| 4,527,326 | A | * | 7/1985 | Kohno et al. | ................... 29/705 |

(Continued)

FOREIGN PATENT DOCUMENTS

| JP | 5-150835 A | 6/1993 |
| JP | 10-111701 A | 4/1998 |

(Continued)

*Primary Examiner* — Rami Khatib
*Assistant Examiner* — Nicholas K Wiltey
(74) *Attorney, Agent, or Firm* — Fitzpatrick, Cella, Harper & Scinto

(57) ABSTRACT

An information processing apparatus comprises an obtaining unit configured to obtain sensing data on an area including an installation target component; a detection unit configured to detect a position/orientation of the installation target component as a component position/orientation based on the sensing data; a setting unit configured to set, based on the component position/orientation and shape data on the installation target component, a candidate gripped portion of the installation target component to be gripped by a hand mechanism; a calculation unit configured to calculate, as a candidate hand position/orientation, a position/orientation of the hand mechanism in which the candidate gripped portion can be gripped; and a generation unit configured to generate candidate teaching data for gripping operation by the hand mechanism by associating the candidate gripped portion and the candidate hand position/orientation with each other.

14 Claims, 16 Drawing Sheets

(56) References Cited

U.S. PATENT DOCUMENTS

| | | | |
|---|---|---|---|
| 4,715,708 A | 12/1987 | Ito | |
| 4,985,846 A * | 1/1991 | Fallon | 382/153 |
| 4,999,513 A | 3/1991 | Ito et al. | |
| 6,167,328 A * | 12/2000 | Takaoka et al. | 700/264 |
| 6,721,444 B1 * | 4/2004 | Gu et al. | 382/154 |
| 7,177,459 B1 * | 2/2007 | Watanabe et al. | 382/151 |
| 7,200,260 B1 * | 4/2007 | Watanabe et al. | 382/153 |
| 7,313,464 B1 * | 12/2007 | Perreault et al. | 700/245 |
| 7,474,939 B2 * | 1/2009 | Oda et al. | 700/245 |
| 7,502,504 B2 * | 3/2009 | Ban et al. | 382/152 |
| 7,657,346 B2 * | 2/2010 | Ban et al. | 700/262 |
| 7,937,346 B2 | 5/2011 | Kato et al. | |
| 7,957,583 B2 * | 6/2011 | Boca et al. | 382/154 |
| 7,966,094 B2 * | 6/2011 | Ban et al. | 700/260 |
| 8,315,739 B2 * | 11/2012 | Dai | 700/259 |
| 8,355,816 B2 | 1/2013 | Saito | |
| 8,504,191 B2 * | 8/2013 | Furukawa | 700/218 |
| 8,538,579 B2 * | 9/2013 | Cottone et al. | 700/217 |
| 8,554,359 B2 * | 10/2013 | Ichimaru | 700/214 |
| 8,660,685 B2 * | 2/2014 | Irie et al. | 700/213 |
| 8,862,267 B2 | 10/2014 | Aoba et al. | |
| 9,043,023 B2 | 5/2015 | Noro | |
| 2004/0005372 A1 * | 1/2004 | Shirahata et al. | 425/135 |
| 2004/0138779 A1 * | 7/2004 | Shibata et al. | 700/245 |
| 2004/0228519 A1 * | 11/2004 | Littlefield et al. | 382/154 |
| 2005/0065653 A1 | 3/2005 | Ban et al. | |
| 2006/0069466 A1 * | 3/2006 | Kato et al. | 700/264 |
| 2007/0177790 A1 * | 8/2007 | Ban et al. | 382/153 |
| 2008/0082213 A1 * | 4/2008 | Ban et al. | 700/260 |
| 2008/0226028 A1 * | 9/2008 | Ross | G01N 23/04 378/58 |
| 2011/0153076 A1 * | 6/2011 | Noro | 700/245 |
| 2011/0218676 A1 * | 9/2011 | Okazaki | 700/260 |
| 2011/0223000 A1 * | 9/2011 | Martinez et al. | 414/730 |
| 2011/0223001 A1 * | 9/2011 | Martinez et al. | 414/730 |
| 2011/0288683 A1 * | 11/2011 | Kondo et al. | 700/260 |
| 2012/0165986 A1 * | 6/2012 | Fuhlbrigge et al. | 700/259 |

FOREIGN PATENT DOCUMENTS

| | | |
|---|---|---|
| JP | 3312808 B2 | 8/2002 |
| JP | 4167954 B2 | 10/2008 |
| JP | 2009-107043 A | 5/2009 |
| JP | 2009-214212 A | 9/2009 |
| JP | 2009-279719 A | 12/2009 |
| JP | 2010-89238 A | 4/2010 |
| JP | 2011-110688 A | 6/2011 |
| JP | 2011-131300 A | 7/2011 |

* cited by examiner

INFORMATION PROCESSING APPARATUS, CONTROL METHOD FOR INFORMATION PROCESSING APPARATUS, AND RECORDING MEDIUM

BACKGROUND OF THE INVENTION

Field of the Invention

The present invention relates to an information processing apparatus, a control method for the information processing apparatus, and a recording medium, and more particularly to an information processing apparatus for generating teaching data for an assembly robot that performs an operation to grip a target component and installing it in a prescribed position of an installation recipient component, a control method for the information processing apparatus, and a recording medium.

Description of the Related Art

There are robot systems that obtain sensing data such as luminance image of a target object and information on the distance to the target object using a sensing function such as a camera or a distance measuring sensor, and grip the target object with their hand mechanism to move it to a target position such as an installation position based on the obtained data.

In such a robot system, it is one of the keys that determine how easily the robot system can be taught about information on a movement target position, a target orientation of the target object or the hand mechanism, a relative gripping orientation of the hand mechanism when gripping the target object, a movement path to the target position, and the like in an operation environment.

With the technique disclosed in Japanese Patent No. 04167954, a user who performs a teaching operation specifies a target point on an image captured by an arm camera. The user then specifies a spatial position of the target point by moving the arm camera based on the position information and specifying the same target point on a newly captured image.

With the technique disclosed in Japanese Patent Laid-Open No. 2009-279719, a master component, in which a simulation component that simulates an installation portion of a second component to be installed on an installation portion of a first component is installed in a position corresponding to a target position, is secured to a pallet, and a camera fixed to the pallet captures an image. Next, an image is captured in a state where the second component is held by a robot with respect to the pallet to which the master component is not secured. A deviation between the position of the simulation component and the position of the second component is calculated from those two images.

With the technique disclosed in Japanese Patent No. 03312808, in the case where insertion of a core into a main mold is performed by a core insertion robot during a casting process, teaching of a core insertion position is performed using an actual main mold and core. Initially, the core is inserted into the main mold positioned at a prescribed core insertion position, and a hand portion is moved above the core and then moved downward to grip the core. Swing movement of the hand portion occurring when gripping the core is detected by a swing movement detection unit, the arm position is corrected to a position in which the swing movement is canceled, and the arm position after the position correction is stored as a core insertion teaching position in a storage unit.

The abovementioned conventional techniques have the following problems. That is, with the technique disclosed in Japanese Patent No. 04167954, the user who performs the teaching operation needs to specify the target position twice. Furthermore, it is impossible to teach a gripping orientation relative to the target object and a target orientation after the movement only with the above operation.

With the technique disclosed in Japanese Patent Laid-Open No. 2009-279719, it is necessary, only for the purpose of teaching, to prepare the master component in which the simulation component that simulates the installation portion of the second component is provided in the position corresponding to the target position and which includes members that are unnecessary during an actual process. Moreover, this technique is used to calculate and correct the deviation at the time of installation, but is not able to teach the grip position of the second component.

With the technique disclosed in Japanese Patent No. 03312808, the core is gripped based on matching using a stereo camera. That is, it is necessary to somehow determine the gripped portion and the gripping orientation relative to the core in advance, and this technique cannot be used for teaching.

SUMMARY OF THE INVENTION

In consideration of the foregoing problem, the present invention provides a technique for easily teaching an assembly robot about installation operations without need of any special jigs or the like or complicated user operation for specification.

According to one aspect of the present invention, there is provided an information processing apparatus comprising: an obtaining unit configured to obtain sensing data on an area including an installation target component in a state of being installed in a prescribed position of an installation recipient component; a detection unit configured to detect at least one of a position and an orientation of the installation target component as a component position/orientation based on the sensing data; a setting unit configured to set, based on the component position/orientation and shape data on the installation target component, a candidate gripped portion of the installation target component to be gripped by a hand mechanism; a calculation unit configured to calculate, as a candidate hand position/orientation, at least one of a position and an orientation of the hand mechanism in which the candidate gripped portion can be gripped; and a generation unit configured to generate candidate teaching data for a gripping operation by the hand mechanism by associating the candidate gripped portion and the candidate hand position/orientation with each other.

According to one aspect of the present invention, there is provided a method for controlling an information processing apparatus, the method comprising the steps of: obtaining sensing data on an area including an installation target component in a state of being installed in a prescribed position of an installation recipient component; detecting at least one of a position and an orientation of the installation target component as a component position/orientation based on the sensing data; setting, based on the component position/orientation and shape data on the installation target component, a candidate gripped portion of the installation target component to be gripped by a hand mechanism; calculating, as a candidate hand position/orientation, at least one of a position and an orientation of the hand mechanism in which the candidate gripped portion can be gripped; and generating candidate teaching data for a gripping operation by the hand mechanism by associating the candidate gripped portion and the candidate hand position/orientation with each other.

Further features of the present invention will become apparent from the following description of exemplary embodiments (with reference to the attached drawings).

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
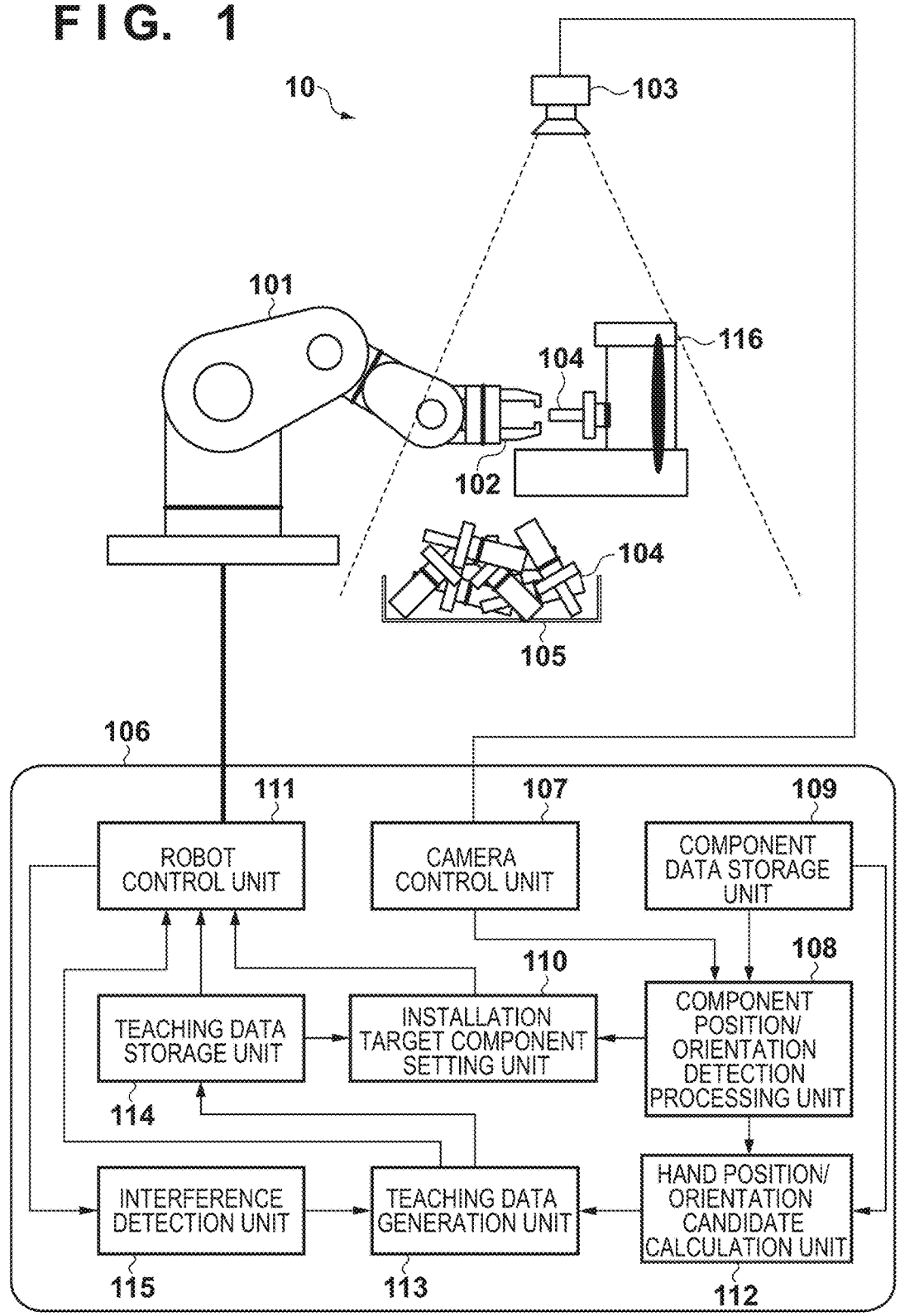
FIG. 1 is a diagram showing a configuration of an assembly robot system according to the first embodiment.

FIG. 1 is a diagram showing a configuration of an assembly robot system according to the first embodiment; an assembly robot system 10 is provided with a robot arm 101, a hand mechanism 102, a camera device 103, and a controller 106. The hand mechanism 102 is an end effecter of the robot arm 101, and is used to grip an installation target component 104. In a component supply tray 105, the installation target components 104 are piled up. Note that components do not have to be supplied in a piled-up state as in FIG. 1. For example, components may be supplied in a state of being aligned in a certain direction on a pallet or the like, and the component supply method is not limited in the present invention. An installation recipient component 116 is an object component on which the installation target component 104 is installed. In the example of FIG. 1, the installation target component 104 is already installed in a prescribed position.

The camera device 103 has a sensing mechanism for obtaining the status of an operation environment including the component supply tray 105, the installation recipient component 116, and the hand mechanism 102. The camera device 103, which is an example of a fixed sensing unit fixedly provided to a non-movable portion in the operation environment, captures an image of the operation environment and obtains image data or the like as sensing data. Note that the camera device 103 may be a single-lens camera for obtaining two-dimensional luminance image information, or a distance measuring sensor such as a stereo camera, a TOF sensor, or a laser range finder for obtaining distance information, and is not limited in the present invention. The controller 106 controls operations of the robot arm 101, the hand mechanism 102, and the camera device 103 that are provided in the assembly robot system. The controller 106 also functions as an information processing apparatus for teaching installation operations. Note that in the assembly robot system in the present invention, the camera device 103 may not be included therein and exist outside the system.

The controller 106 includes a camera control unit 107, a component position/orientation detection processing unit 108, a component data storage unit 109, an installation target component setting unit 110, a robot control unit 111, a hand position/orientation candidate calculation unit 112, a teaching data generation unit 113, a teaching data storage unit 114, and an interference detection unit 115.

The camera control unit 107 controls image capturing of the camera device 103. The camera control unit 107 also has a sensing data input function, and inputs image data or the like captured by the camera device 103 as sensing data to the controller 106.

The component position/orientation detection processing unit 108 scans the input sensing data and detects the position and orientation in which the installation target component 104 exists. The camera device 103 is calibrated in advance so as to conform to a positional relationship in the operation environment, and accordingly, the position and orientation of a component detected from the sensing data can be converted into information on the position and orientation in actual operation space.

The component data storage unit 109 stores data on shape characteristics, size, and the like of the installation target component 104 used for detection processing.

Note that only a configuration is possible in which only the position of the installation target component 104 is detected depending on the robot system, such as the case where the installation target component 104 is always supplied in a certain orientation, gripped by the hand mechanism 102, and then installed in a prescribed position of the installation recipient component 116 with only three-dimensionally translational movement. Alternatively, a configuration is possible in which only the orientation is detected in the case where the component supply position and the installation position are fixed while only the orientation is unknown, and only either the position or the orientation needs to be detected, depending on the robot system.

The component position/orientation detection processing unit 108 is also used at the time of teaching operations. The sensing data input by the camera device 103 includes information on the installation target component 104 in a state of being installed on the installation recipient component 116. The position and orientation of the installation target component 104 in the state of being installed are detected by performing similar processing on the sensing data. Also, candidates for a grip position of the component is set based on the detected position/orientation information and the component shape information stored in the component data storage unit 109.

The installation target component setting unit 110 selects a candidate component to be gripped as the installation target based on the result of processing, by the component position/orientation detection processing unit 108, the sensing data on the area including the component supply tray 105 captured by the camera device 103, and sets the grip position and the gripping orientation of the hand. At this time, the gripping orientation corresponding to the information on the grip position in the installation target component 104 stored in the teaching data storage unit 114 is referred to. There is no particular restriction on the method for selecting the component to be an installation target, while in the case where components are supplied in a piled-up state as in the present embodiment, for example, a method of selecting a component which is located in an uppermost layer and whose grip position is not hidden, or a component with a high reliability in detection by the component position/orientation detection processing unit 108 is conceivable.

The robot control unit 111 controls the robot arm 101 and the hand mechanism 102 based on the information on the set grip position and the gripping orientation of the hand, and causes an operation to grip the selected installation target component 104 to be performed. The robot control unit 111, after the gripping operation, refers to installation operation teaching data held in the teaching data storage unit 114, and causes an operation to install the installation target component 104 in a prescribed position of the installation recipient component 116 to be performed. Note that the installation operation teaching data includes an installation target position and hand position/orientation information at the time of completion of installation, and the robot control unit 111 makes an operation plan and drives the robot arm 101 so that the hand mechanism 102 comes in this position/orientation state.

At the time of the teaching operation, the hand position/orientation candidate calculation unit 112, with respect to each candidate grip position set by the component position/orientation detection processing unit 108, calculates a candidate position/orientation (that is, installation completion state) of the hand mechanism 102 with which the grip position can be gripped.

The teaching data generation unit 113 set, to the robot control unit 111, the candidate position/orientation of the hand mechanism calculated by the hand position/orientation candidate calculation unit 112 as a target state. The robot control unit 111 controls driving of the robot arm 101 and the hand mechanism 102 so as to be in the target state. If the robot arm 101 and the hand mechanism 102 are in the target state without interference or the like occurring as a result of driving, this target state is stored as a part of the installation teaching data in the teaching data storage unit 114 that holds the teaching data.

When the robot arm 101 or the hand mechanism 102 are driven, if the robot arm 101, the hand mechanism 102, or the installation target component 104 collides with the installation recipient component 116, the operation environment, or the like, force sensors (not shown) provided to the robot arm 101 and the hand mechanism 102 output abnormal values. The interference detection unit 115 monitors output values of those force sensors via the robot control unit 111, and upon detecting an abnormal value, determines that interference has occurred and notifies the teaching data generation unit 113.

Here, the component position/orientation detection processing unit 108 is a classifier for detecting a position of a target object and classifying its orientation. An orientation corresponding to each class is referred to as a representative orientation, and is defined by combination of a geodesic dome and in-plane rotation. The geodesic dome is a known method for expressing a sphere in a uniformly discretizing manner by using center points of vertexes or surface elements of a regular polyhedron, or by recursively dividing each triangle surface element of a regular polyhedron to form triangles of the same area and using vertexes of the formed triangles.

Figure 2:
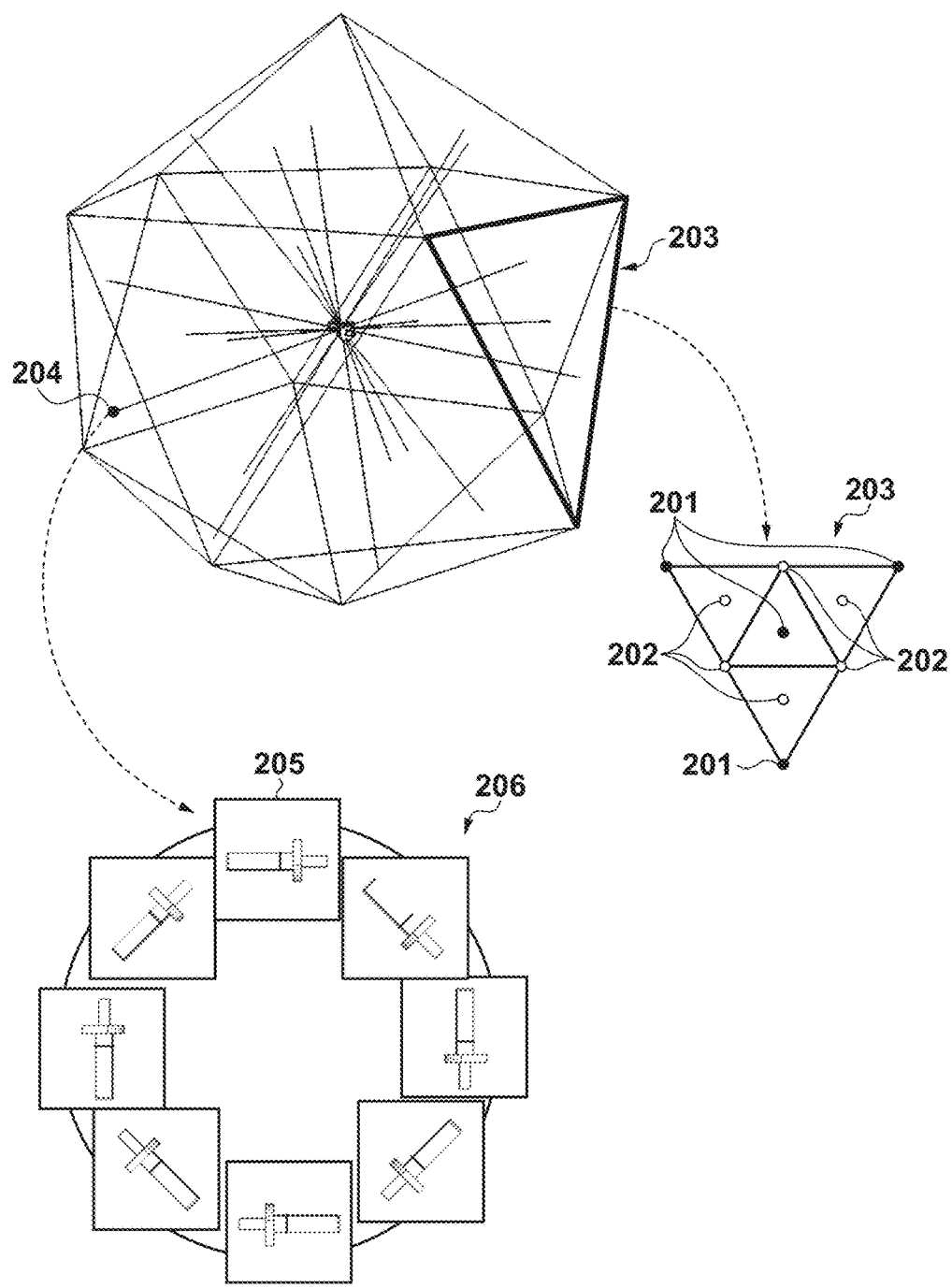
FIG. 2 is a diagram illustrating an example of a geodesic dome for orientation detection having a basic shape of a regular icosahedron.

FIG. 2 shows an example of a geodesic dome with a basic shape of a regular icosahedron. The gravity center of a target object in a prescribed orientation is arranged so as to agree with the center point of the regular icosahedron, and for example, appearances of the target object seen from viewpoints that are the center points of the vertexes and triangle surface elements are defined as the representative orientations. Lines of sight from the viewpoints intersect at the center point of the target object, that is, the gravity center of the regular icosahedron. Because the regular icosahedron has 16 vertexes and 20 surface elements, the representative orientations obtained from the total of 36 viewpoints can be defined in the geodesic dome that uses a regular icosahedron as it is.

However, a sufficient accuracy for griping cannot usually be achieved with such a granularity, and therefore, each side of the surface elements is further divided into two in the present embodiment. Then, each regular triangle surface element of the regular icosahedron is constituted by four small regular triangles with the same areas, as shown by a regular triangle surface element 203. Here, viewpoints 201 denote the total of 4 viewpoints defined by the vertexes and the surface element center point of the original regular icosahedron, and viewpoints 202 denote 6 viewpoints added by dividing the regular icosahedron into small triangles. Because the number of surface center points is increased to 4 times the number of original triangle surface elements (20 surfaces) before division, and the number of vertexes is increased by the number of sides of the original regular icosahedron (=34 sides), the representative orientations can be defined from the viewpoints of 16+34+20×4=130 patterns as a result of this division.

An image group 206 represents an example of in-plane rotation. An image 205 is an image of a component obtained from the viewpoint 204, and a plurality of representative orientations as shown by an image group 206 can be obtained by rotating the image in increments of a prescribed angle. In the present embodiment, the in-plane rotation is defined in increments of 10 degrees. That is, there are 36 in-plane rotation patterns with respect to each of the above-mentioned 130 viewpoints, and therefore, 130×36=4680 patterns of the representative orientations are defined.

Here, a viewpoint is, namely, the camera device 103, and so the representative orientations correspond to individual image variation of the target object obtained by the camera device 103. The component data storage unit 109 holds, in advance, reference data based on the image data on all representative orientations captured while varying the orientation of the component. Reference numerals 3001 to 3005 in FIG. 3 denote examples of image data on the respective representative orientations.

Figure 3:
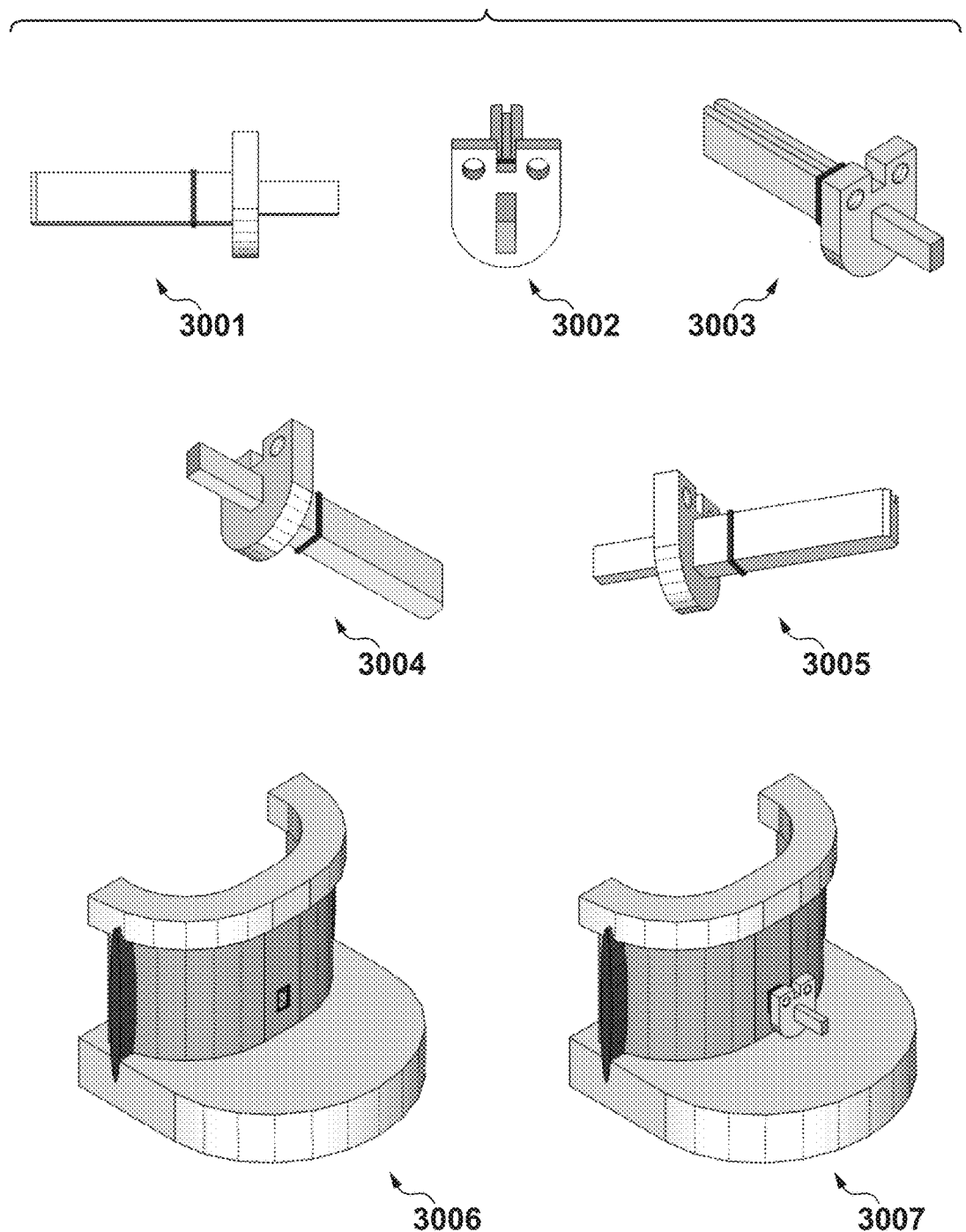
FIG. 3 is a diagram showing examples of representative orientations of an installation target component and an example of an installation recipient component.

Reference numeral 3006 in FIG. 3 denotes an example of image data obtained by capturing an image of the installation recipient component 116 arranged in a prescribed position with the camera device 103. Reference numeral 3007 in FIG. 3 denotes an example of image data on the installation recipient component 116 in a state where the installation target component 104 is installed thereon. The orientation of the installation target component 104 in a state of being installed, observed by the camera device 103, agrees with the example shown by reference numeral 3003 in FIG. 3, but is partially hidden by the installation recipient component 116 and cannot be seen.

In the present embodiment, the component position/orientation detection processing unit 108 detects, based on so-called template matching processing, the position and orientation of each installation target component 104 in a camera coordinate system, which is a coordinate system based on the camera device 103.

Accordingly, the component data storage unit 109 holds all units of reference data (templates) corresponding to 4680 patterns of the representative orientation class. Meanwhile, the data volume to be held may be reduced by not holding all templates, but holding only 130 patterns of template obtained by 0-degree rotation from the respective viewpoints, and generating, by performing rotation processing, the templates associated with in-plane rotation every time reference is made.

Here, the position of a reference point (an object center or the like) of the installation target component 104 in the camera coordinate system is represented as a translation vector $P_w$ from an origin of the camera coordinate system. This is equivalent to position information on the detected installation target component 104. The position in a depth direction seen from the camera may be estimated based on the size of the detected component in the image, or separately estimated with higher accuracy using a distance measuring sensor such as a range finder.

It is then determined which representative orientation class of template matches best, and thus the orientation of the target object is estimated. The orientation of the target object can be represented by an orientation matrix $E_W=[e_{WX}, e_{WY}, e_{WZ}]$ based on a set of direction vectors along three axes in a component coordinate system in the camera coordinate system. $e_{WX}$, $e_{WY}$, and $e_{WZ}$ are unit column vectors with a length of 1 that fixed to three respective orthogonal directions from a reference position of the installation target component. That is, each representative orientation is associated with a unique orientation matrix $E_W$.

Also, the position (gripped portion) to be gripped by the hand mechanism 102 needs to be a position suitable for installation. That is, it needs to be a portion that can be gripped in an installation completion state, and so visible portions that are not hidden by the installation recipient component 116 in the installation completion state shown by reference numeral 3007 in FIG. 3 are candidates. The specific method for setting the gripped portion will be described later.

The gripped portion of the installation target component 104 in a state of being gripped can be defined by the center position $P_h$ and the orientation matrix $E_h$ of the installation target component in a hand coordinate system based on the hand mechanism 102. This is a parameter indicating a relative gripping orientation of the hand and the component. Note that an origin of the hand coordinate system is a center of gripping point of two fingers that perform gripping, that is, the gripping center, and the directions of three axes are respectively fixed to prescribed directions. The robot control unit 111 makes a gripping operation plan for joints of the robot arm 101 and the hand mechanism 102 and performs control so that the center position $P_w$ and the orientation $E_W$ of the installation target component 104 to be gripped in the camera coordinate system agree with the center position $P_h$ and the orientation $E_h$ in the hand coordinate system.

Three axes of individual coordinate systems are fixedly associated with each of the shafts (links) that are separated by movable joints of the robot arm, and positions and orientations of two connected links including the hand coordinate system can be mutually represented in one another's coordinate system. In other words, by sequentially tracing the links from the hand and performing coordinate transformation, the position and orientation can be eventually represented in a coordinate system having three axes fixed in the operation environment. In the present embodiment, this coordinate system is referred to as a robot coordinate system based on a fixed position of the robot. Note that possible rotational directions of the two connected links are determined by the joints. The robot control unit 111, which holds a robot model indicating a connection relationship such as a degree of freedom in rotation among the links, makes an operation plan and performs control.

Figure 4:
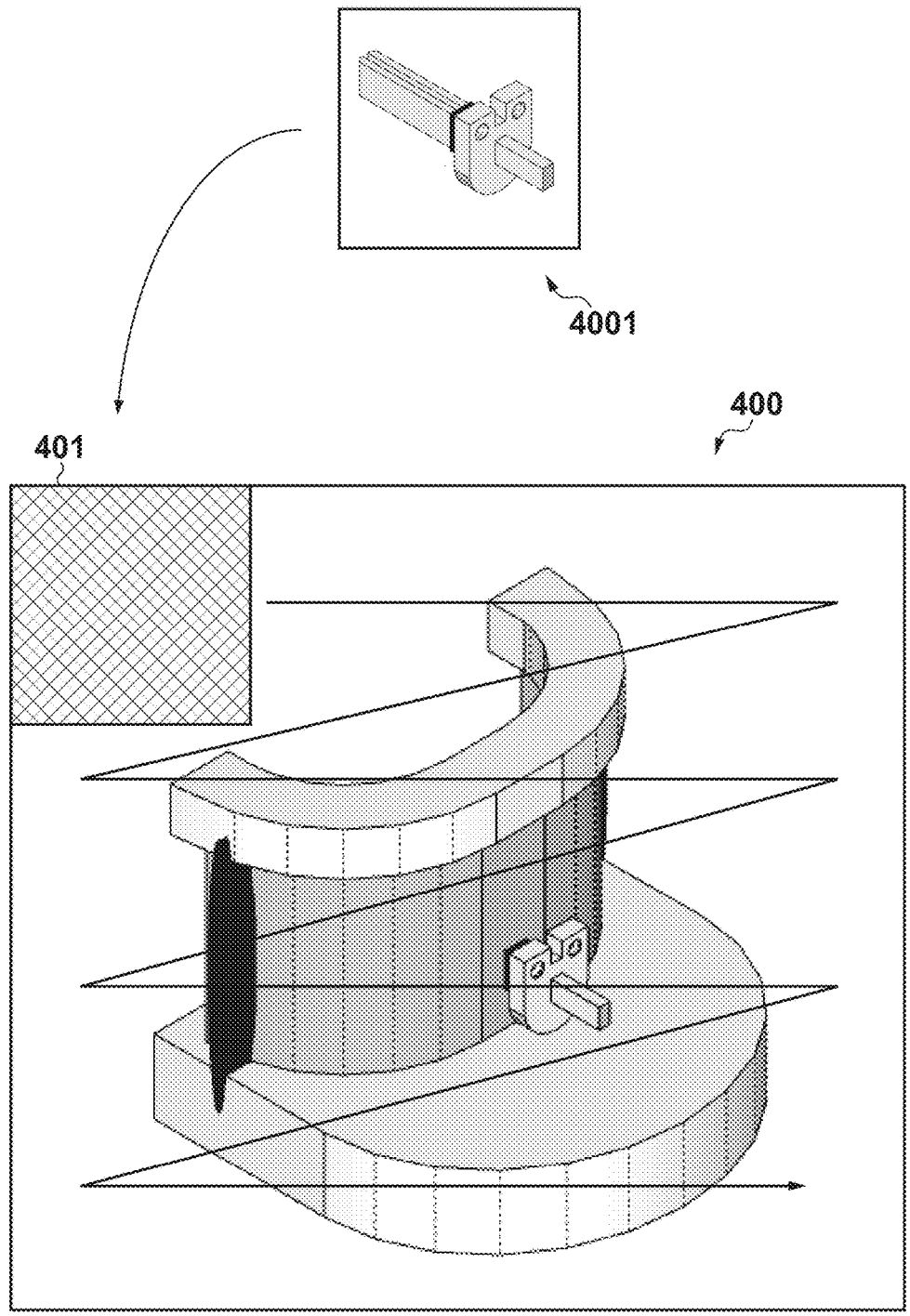
FIG. 4 is a diagram illustrating processing for detecting a position/orientation of the installation target component based on template matching.

Now, a position/orientation detection method using template matching processing performed by the component position/orientation detection processing unit 108 according to the present embodiment will be described with reference to FIGS. 4 and 5. Reference numeral 4001 in FIG. 4 shows an example of a template. This template is a template for detecting the installation target component 104 in an orientation that agrees with that shown by reference numeral 3003 in FIG. 3 when seen from the camera device 103. Templates of other orientations are not shown here, but the same processing as described below is performed thereon.

FIG. 4 shows the position/orientation detection processing using template matching being performed by performing scanning processing on an image 400. The image 400 is an example of image data of an area including the installation recipient component 116 in a state where the installation target component 104 is installed in a prescribed position, captured by the camera device 103. A cutout window 401 is a window of the same size as a template set on the image 400. The cutout window 401 thoroughly scans an entire image (or an area where it is known in advance that the component exists).

A partial image of a rectangular area cut out by the cutout window 401 is subjected to calculation of correlation with the template, and it is determined that the component in the representative orientation corresponding to the template exists in the position of the highest correlation. When this processing is performed, if the orientation in a state of being installed viewed from the camera device 103 is not known, the same processing is performed sequentially using templates corresponding to a plurality of representative orientations. If there are several templates indicating a correlation equal to or larger than a prescribed threshold at the respective positions, the representative orientation corresponding to the template of the highest correlation is determined as the orientation of the component.

Also, if the distance to the component is estimated based on the detected component size, the scale factor of the template is changed within a prescribed range, and it is determined that the component is located at a distance corresponding to the template whose size matches best. As another example, a stereo camera may be used as the camera device 103, and the distance may be estimated by associating the positions of the component detected from two images among captured stereo images with each other and applying the principle of triangulation, or alternatively, a range finder or the like may be used together.

Also, not using a luminance image directly as a template to be used, but prescribed preprocessing such as edge extraction may be performed thereon, and scan may be performed after the same processing is performed on the image 400. Thus unnecessary information such as noise is eliminated, and improvement in detection accuracy can be expected.

Note that as is clear from FIG. 4, in a state of being installed in a prescribed position, the entire installation target component 104 does not appear on the image data. Accordingly, compared with detecting the installation target component 104 whose entire body appears in the image data at a component supply position or the like, the threshold used for measuring the degree of agreement with templates need to be lowered to perform the detection processing.

Although the component position/orientation detection processing based on the above-described template matching is applied in the present embodiment, the present invention is not limited thereto. For example, the present invention can also be applied to detection processing based on Hough transform that detects a position and an orientation by casting votes for local matching results.

Next, a procedure of teaching processing for teaching an installation operation performed by the assembly robot system of the present embodiment will be described with reference to the flowchart in FIGS. 5A-5B. In this teaching processing, a hand gripping orientation suitable for installation is generated as teaching data associated with the gripped portion of the installation target component 104, and is held so as to be able to be used at the time of the installation operation. This teaching processing is started in a state where the installation target component is installed on the installation recipient component and arranged at a prescribed position in advance by a user. The prescribed position is the same position as the position in which the installation recipient component is arranged when the robot performs the installation operation.

In S501, the camera device 103 captures an image of an area including the installation target component 104 in a state of being installed on the installation recipient component 116, and obtains image data. In step S502, the component position/orientation detection processing unit 108 detects the position and orientation of the installation target component 104 in the obtained image data. In this process, as described above, the component in each orientation class seen from the camera viewpoint is detected based on the template matching processing.

Figure 7A:
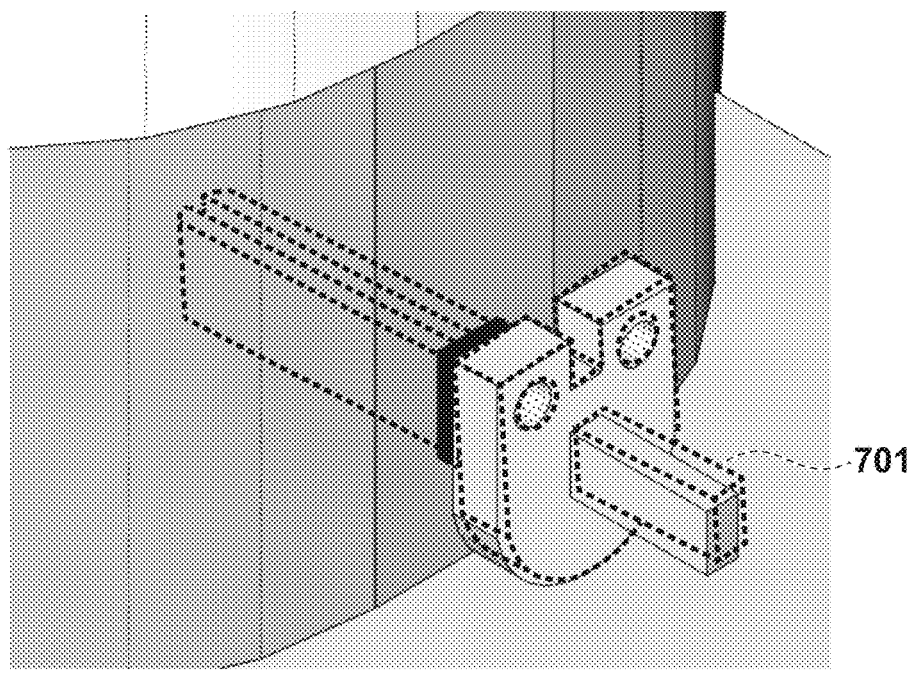
FIGS. 7A and 7B are diagrams showing an example of how fitting processing is performed.
Figure 7B:
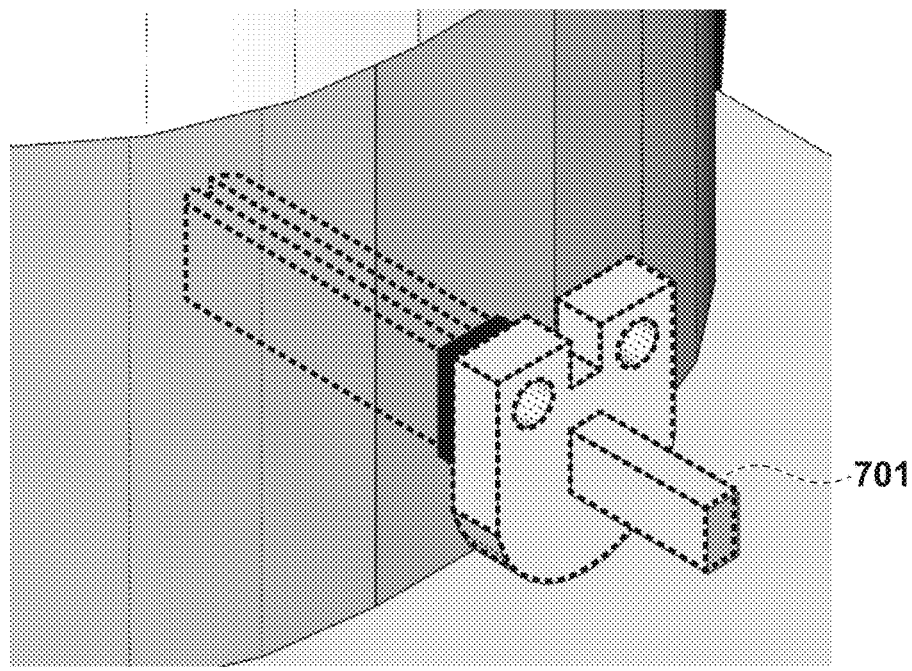

In step S503, the component position/orientation detection processing unit 108 performs processing for fitting the detection result and shape model data on the component stored in the component data storage unit 109. Aspects of this fitting processing will be described with reference to FIGS. 7A and 7B. Based on the representative orientations and position information in the image data obtained in step S502, ideal frame data (dotted line 701 in FIG. 7A) on the component obtained from the camera viewpoint that is calculated from the shape model data is arranged, as an initial state, in the image. Also, edge extraction processing that serves as preprocessing is performed in advance on the image data. Then the position where the edges in the frame data agree with the edges in the image to the highest degree is searched, and the searched position is calculated as a correct component position in the camera coordinate system (in FIG. 7B, a gap between the dotted line 701 and the component is cancelled). Note that if the sensing data is a distance image, the same search may be performed not on edges but on planes.

The component position information obtained by the fitting processing is a position vector $P_w$ from an origin, which is the reference point of the installation target component in the abovementioned camera coordinate system, and orientation information is represented as an orientation matrix $E_W$. Because the camera device is calibrated with respect to operation space, it is easy to perform conversion into a coordinate system (the robot coordinate system in the present embodiment) fixed to the operation space.

In step S504, the component position/orientation detection processing unit 108 performs processing for determining a visible portion of the installation target component 104 as a candidate for a gripped portion of the component that can be used when the installation operation is performed. As is clear from FIG. 7B, an edge of an invisible portion of the installation target component 104 does not agree with that of the image data. Accordingly, it is possible to determine, as the visible portion, the component position corresponding to an edge of frame data of a high degree of agreement with an edge in the image data (the position that can be extracted from the sensing data).

Therefore, in step S503, the component position/orientation detection processing unit 108, when generating the frame data from the shape model data on the component, divides in advance each edge constituting the frame data into edges of prescribed small length so that each divided edge can be indexed and associated with the component position information. The component position information at this time is represented as a position coordinate in the component coordinate system. Then, in step S504, the component position/orientation detection processing unit 108 calculates the degree of agreement with the edges in the image data with respect to each divided edge, and binarizes the result by performing threshold processing. Next, the component position/orientation detection processing unit 108 checks, with respect to the remaining divided edges that are determined to agree, whether or not any adjacent divided edges are also remaining, and the divided edges with no adjacent divided edges remaining are determined as an outlier which only happened to agree, and eliminated. The visible area of the component can be determined by integrating the position information on the eventually remaining divided edges.

It is compared with the component shape data, and thus a portion suitable for being stably gripped is selected, taking into consideration the width of each visible portion, its proximity to the gravity center, the size of its area that comes in contact with the hand when being gripped, and the like. Here, a plurality of portions may be selected as the candidates. Each candidate gripped portion is represented by a position vector from the origin in the component coordinate system.

Alternatively, the candidate gripped portions may be determined in advance based on the component shape data, and the component data storage unit 109 may be provided with a gripped portion information holding unit for holding that information. In this case, in step S504, the component position/orientation detection processing unit 108 needs only refer to the information on the candidate gripped portions held in the gripped portion information holding unit.

Note that it is performed using a known technique to convert each candidate gripped portion into a position in the actual operation space by associating, with the component shape information, the position and orientation of the component confirmed by the fitting processing in step S503.

Figure 8A:
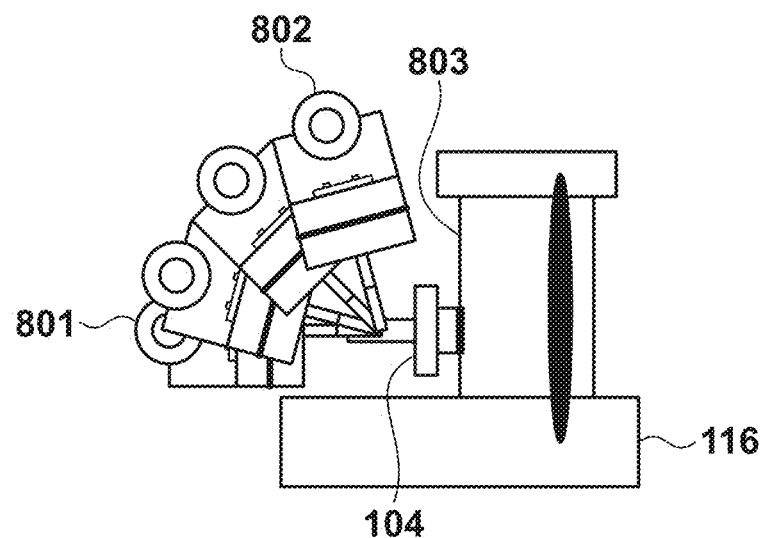
FIGS. 8A and 8B are diagrams showing an example of possible search of gripping orientation relative to the installation target component.
Figure 8B:
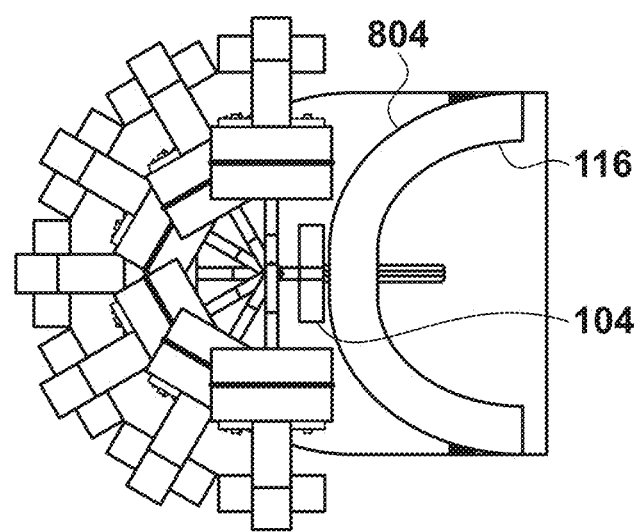

In step S505, the hand position/orientation candidate calculation unit 112 selects one gripped portion for installation, and calculates several candidate gripping orientations of the hand mechanism 102 in which the selected gripped portion can be gripped, relative to the installation target component 104. The candidate gripping orientations of the hand at this time represent, in the component coordinate system, the orientations on the three axes and the origin positions of the hand coordinate system, and it is easy to perform conversion into the abovementioned position $P_h$ and the orientation matrix $E_h$ that represent the position and orientation of the component in the hand coordinate system. The hand orientation capable of gripping a single portion is not always defined uniquely, and usually, as shown in FIGS. 8A and 8B, the orientations in a certain range in which the hand is rotated around the gripped portion are grippable orientations. A plurality of orientations determined by sampling the orientation within this range at every prescribed angle are extracted as the candidate hand gripping orientations.

Note that between FIGS. 8A and 8B, the gripped surface of the installation target component 104 is different. The surface 804 in FIG. 8B is a curved surface, and has a wider rotation angle at which the surface 804 can be gripped without interfering with the installation recipient component 116, but the area that comes in contact with the hand is narrow because of the shape of the installation recipient component 116, and so the surface 803 in FIG. 8A can be gripped more stably. In FIG. 8A, compared with the orientation 802, the orientation 801 can obtain a wider area in which the installation target component 104 and the installation recipient component 116 comes in contact with each other, and more stable gripping is possible. The candidate orientations can be assigned priorities by taking the above into consideration.

Further, in step S506, the hand position/orientation candidate calculation unit 112 calculates, with respect to each of the extracted candidate hand gripping orientations, the position and orientation of the hand mechanism 102 for actually gripping the candidate gripped portion of the installation target component 104 in a state of being arranged in the operation space and installed on the installation recipient component 116. Here, the hand grip position orientation is converted into that in the robot coordinate system by causing the component coordinate system to conform to the position and orientation of the installation target component in the robot coordinate system extracted in step S503.

The above-calculated candidate gripped portions for the installation target component 104, relative gripping orientations of the hand mechanism 102 suitable for gripping each candidate gripped portion, and candidate positions and orientations of the hand mechanism 102 in the operation space for gripping the gripped portion of the installation target component 104 in a state of being installed are managed in sets as candidate teaching data.

In step S507, the robot control unit 111 calculates a target of each inter-link angle of the robot arm 101 so as to take the hand gripping position and orientation calculated in step S506, and causes a gripping operation to be performed. Here, all inter-link angles obtained when the hand eventually agrees with the target position and orientation after the connected links are rotated sequentially from the link of a fixed axle of the robot in a direction towards the position of the target, which is the hand gripping position and orientation calculated in step S506, are calculated. If the hand cannot be caused to agree with the target position and orientation, it is determined that the robot system cannot execute this hand gripping position and orientation, and the gripping operation is not performed.

In step S508, the interference detection unit 115 determines whether or not the planned gripping operation is successful. If interference is detected by the interference detection unit 115 during the operation, the gripping operation is determined to be unsuccessful. If the gripping operation is determined to be successful (S508; YES), the processing proceeds to S509. Meanwhile, if the gripping operation is determined to be unsuccessful (S508; NO), the processing proceeds to S510.

In step S509, the teaching data storage unit 114 associates, with one another, this hand gripping orientation for installation, the gripped portion of the component, and additionally the target position and orientation after installation, and determines and stores them as one set of teaching data for teaching an installation target state.

In step S510, the hand position/orientation candidate calculation unit 112 determines whether or not the candidate hand gripping orientation processing with respect to all candidate gripped portions that are subjected to the processing has completed. If it is determined that the candidate hand gripping orientation processing has completed (S510; YES), the processing proceeds to S512. Meanwhile, if it is determined that there are any candidate hand orientations on which the processing has not been performed (S510; NO), the processing proceeds to S511.

In step S511, the hand position/orientation candidate calculation unit 112 selects the next candidate hand orientation for installation. After that, the processing returns to S506. In step S512, the component position/orientation detection processing unit 108 determines whether or not the candidate component gripped portion processing has completed. If it is determined that the candidate component gripped portion processing has completed (S512; YES), the processing ends. Meanwhile, if it is determined that there are any candidate gripped portions on which the processing has not been performed yet (S512; NO), the processing proceeds to S513. In step S513, the component position/orientation detection processing unit 108 selects the next candidate gripped portion for installation. After that, the processing returns to S504.

As a result of the above-described teaching processing flow, usually several sets of the hand gripping orientation for installation and the gripped portion of the component are generated and stored as the teaching data. Furthermore, the sensing data may be contained, as target position/orientation information after installation, in the teaching data.

Next, a procedure of processing for gripping and installing the component using the teaching data generated as a result of the processing in FIGS. 5A and 5B will be described with reference to the flowchart in FIG. 6.

In step S601, the camera device 103 captures an image of the component supply tray 105 on which the installation target components 104 are loaded, and obtains image data. In the present embodiment, a component supply tray on which the components are piled up as shown in FIG. 1 is presumed, but the mode of supply in the present invention is not limited, as mentioned above.

In step S602, the component position/orientation detection processing unit 108 detects the position and orientation of the installation target component 104 based on the captured image data. This process is the same as the process in step S502 in the teaching processing flow in FIGS. 5A and 5B, and parameters such as thresholds are adjusted as necessary. Here, the position and orientation of several components are possibly detected, different from the process in step S502, but the following processes are performed after selecting a single component.

In step S603, the component position/orientation detection processing unit 108 performs the processing for fitting with the component shape data, as in the process in step S503: it first calculates the accurate position and orientation of the selected component in the camera coordinate system, and then converts the position and orientation into those in the robot coordinate system in the operation space.

In step S604, the robot control unit 111 selects and reads out one set of teaching data, which are the sets of the hand gripping orientation for installation, the gripped portion of the component, and additionally the target position and orientation after installation stored in the teaching data storage unit 114.

Then, in step S605, the robot control unit 111 determines whether or not the detected installation target component 104 can be gripped in the hand gripping orientation for installation indicated by the teaching data. If it is determined that the detected installation target component 104 can be gripped (S605; YES), the processing proceeds to S607. Meanwhile, if it is determined that the detected installation target component 104 cannot be gripped (S605; NO), the processing proceeds to S606. Specifically, the position and orientation of the hand mechanism 102 represented in the component coordinate system on the teaching data are converted into the position and orientation represented in the robot coordinate system in the operation space based on the position and orientation of the selected installation target component 104. After that, if the above position and orientation of the hand mechanism 102 can be taken by driving the robot arm 101, and if the hand mechanism 102 and the robot arm 101 do not interfere with the operation environment including the component supply tray 105, it is determined that gripping is possible.

In step S606, the robot control unit 111 determines whether or not the currently used teaching data is the last set of the teaching data. If it is determined as the last set of the teaching data (S606; YES), it is determined that the detected installation target component 104 cannot be gripped, and the processing is advanced for the next installation target component 104 or the next component supply tray 105. Meanwhile, if it is determined that other pieces of the teaching data are still remaining (S606; NO), the processing returns to S604.

In step S607, the robot control unit 111 calculates each inter-link angle of the robot arm 101 and the hand mechanism 102 so as to take the hand gripping position and orientation in the robot coordinate system calculated in step S605, and executes an operation to grip the installation target component 104.

In step S608, the robot control unit 111 performs the installation operation by driving the robot arm 101 based on the data on the target position and orientation of the hand mechanism 102 after installation indicated by the teaching data, while gripping the installation target component 104.

In step S609, the robot control unit 111 cancels the gripping state, returns the hand mechanism 102 to a prescribed position, and ends the installation operation.

According to the present embodiment, it is possible for a user to teach an installation operation to the assembly robot, using only the information on the installation target component arranged in a prescribed position in the operation environment in a state of being installed in a prescribed position of the installation recipient component.

According to the present embodiment, it is possible to easily teach an assembly robot about an installation operation without need of any special jigs or the like, or complicated user operation for specification.

Second Embodiment

In the first embodiment, in step S507 the robot is driven so as to take the calculated hand position and orientation, and in step S508 whether or not interference has occurred during the operation is determined. Interference is caused when a movable portion such as the arm or hand of the robot, or the gripped installation target component collides with fixed portions in the operation environment such as the installation recipient component, the component supply tray, or a working table, and therefore, reducing the frequency of such collision as much as possible is required from the viewpoint of fault tolerance.

In the present embodiment, the operation to grip the installation target component in a state of being installed is executed only when the interference possibility is low, and a teaching processing flow with reduced possibility of breakdown is thus achieved. The procedure of teaching processing in the present embodiment will be hereinafter described with reference to the flowchart in FIGS. 9A and 9B.

Figure 5A:
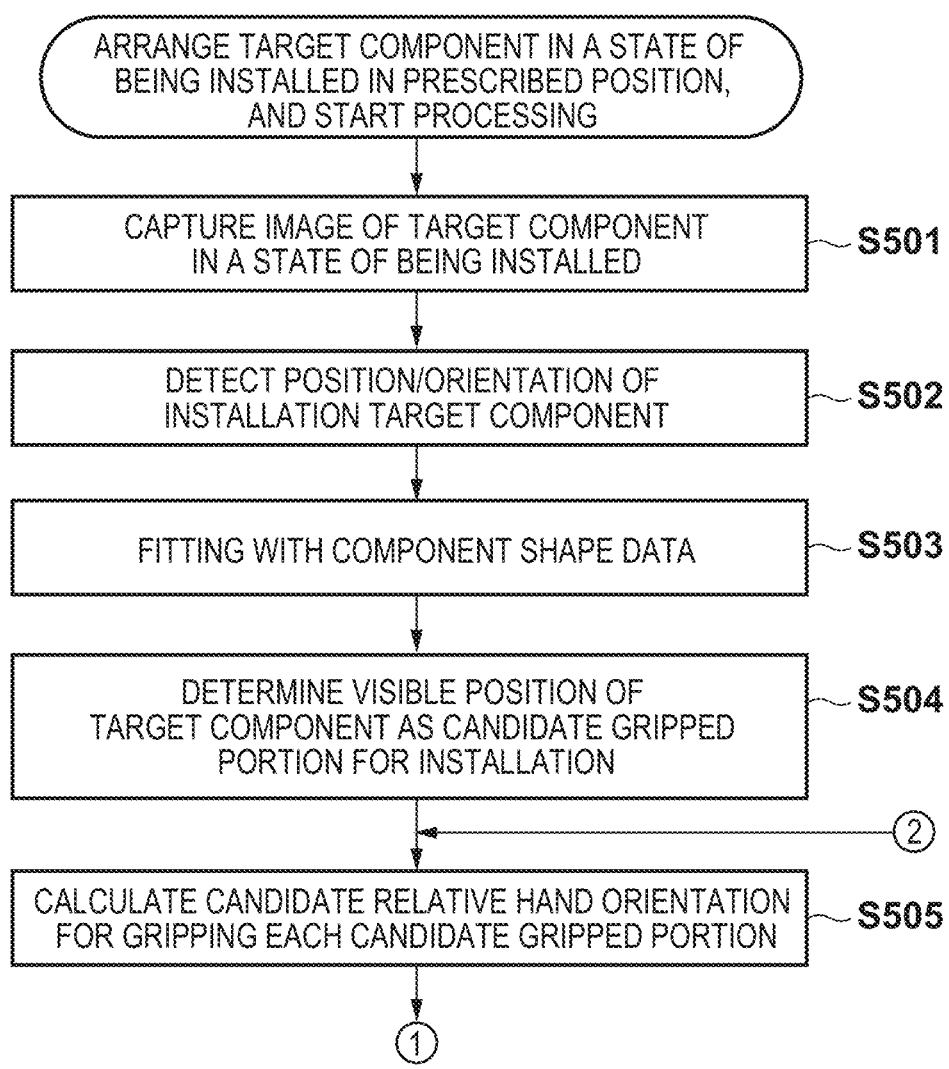
FIGS. 5A and 5B are flowcharts showing a procedure of teaching processing according to the first embodiment.
Figure 5B:
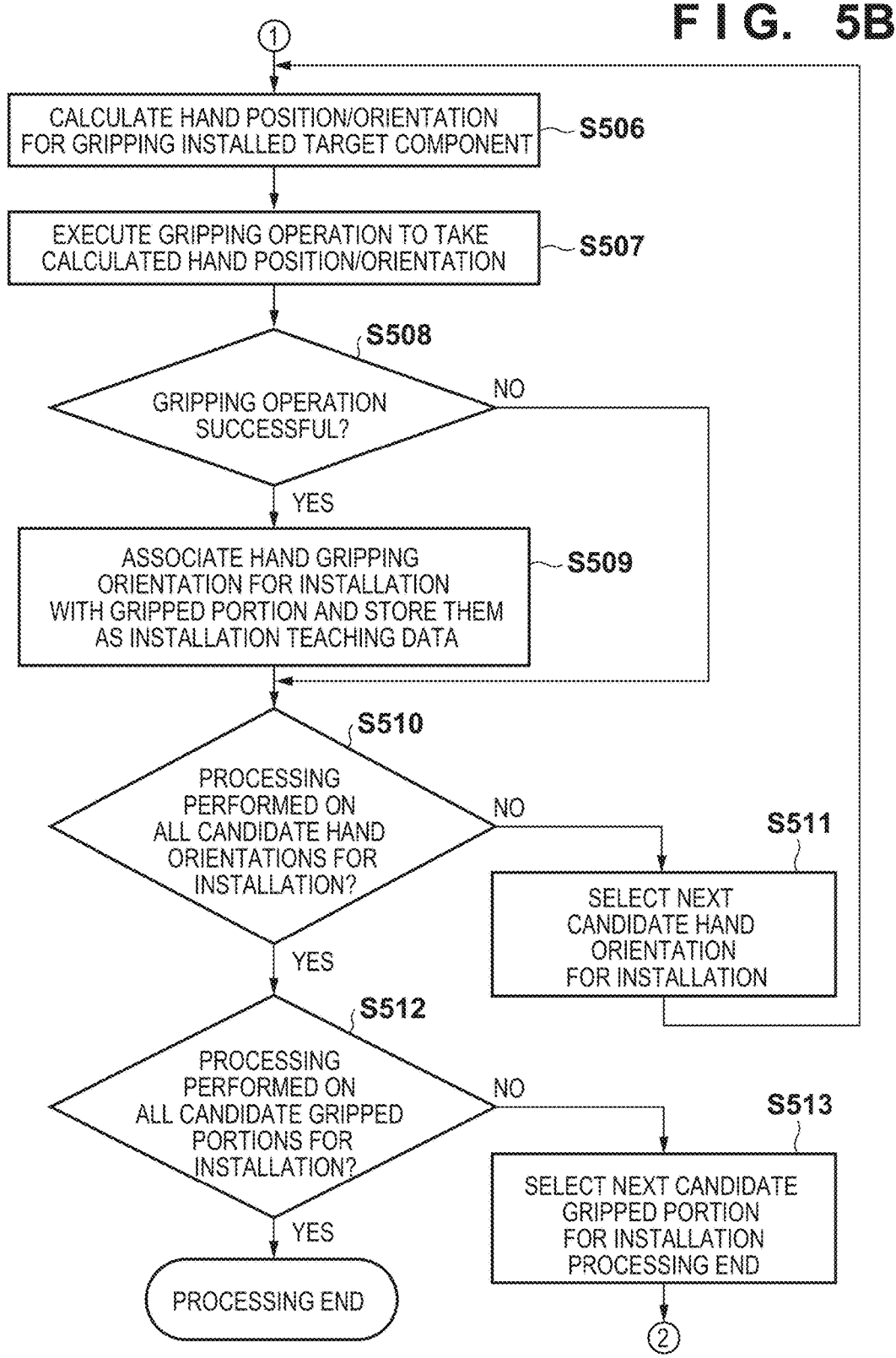
Figure 6:
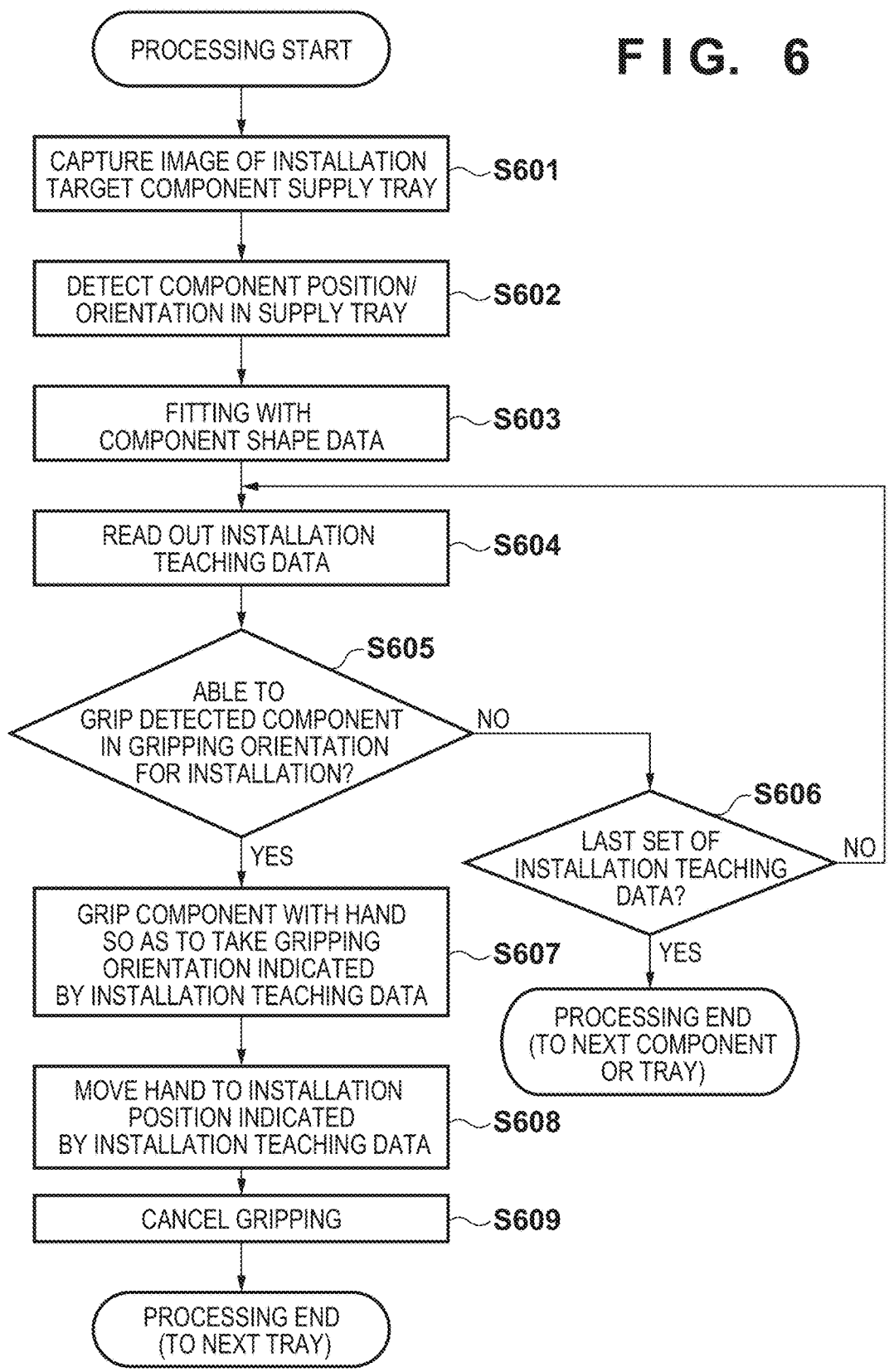
FIG. 6 is a flowchart showing a procedure of installation processing according to the first embodiment.
Figure 9A:
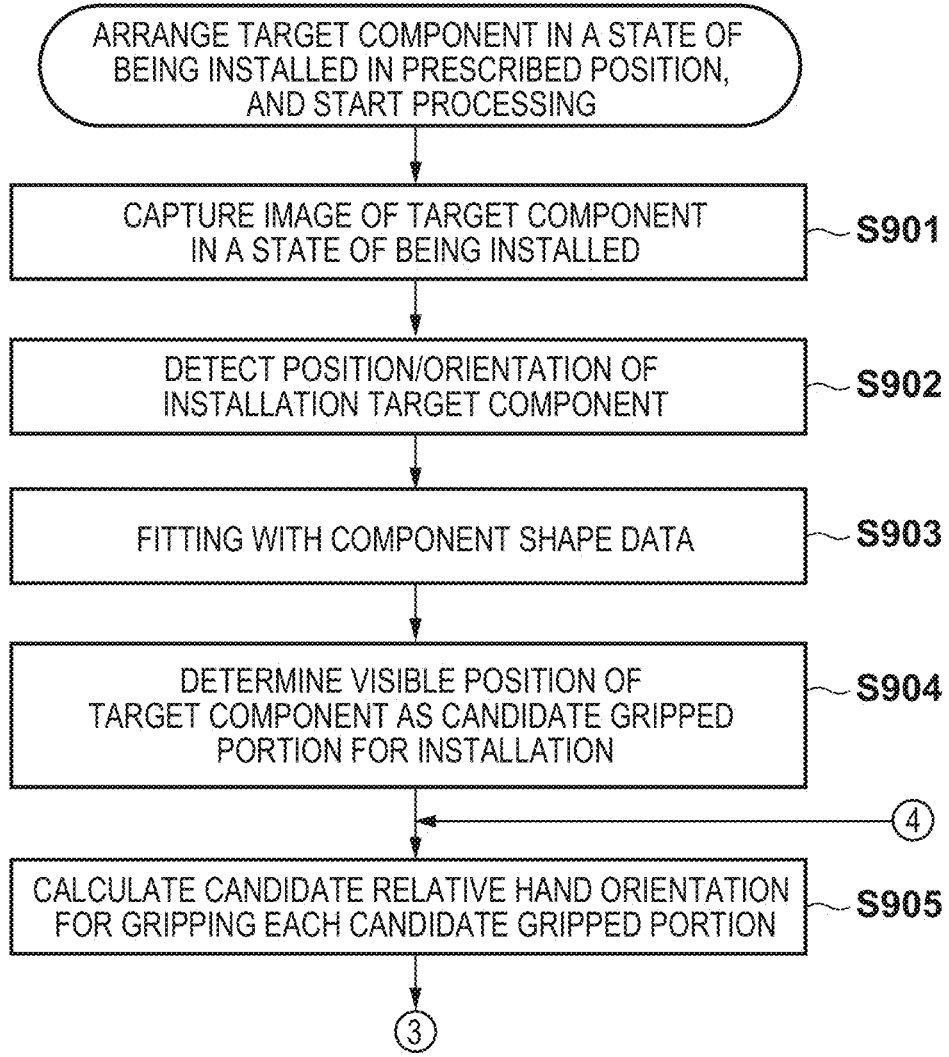
FIGS. 9A and 9B are flowcharts showing a procedure of teaching processing in which a possibility of occurrence of interference is reduced according to the second embodiment.
Figure 9B:
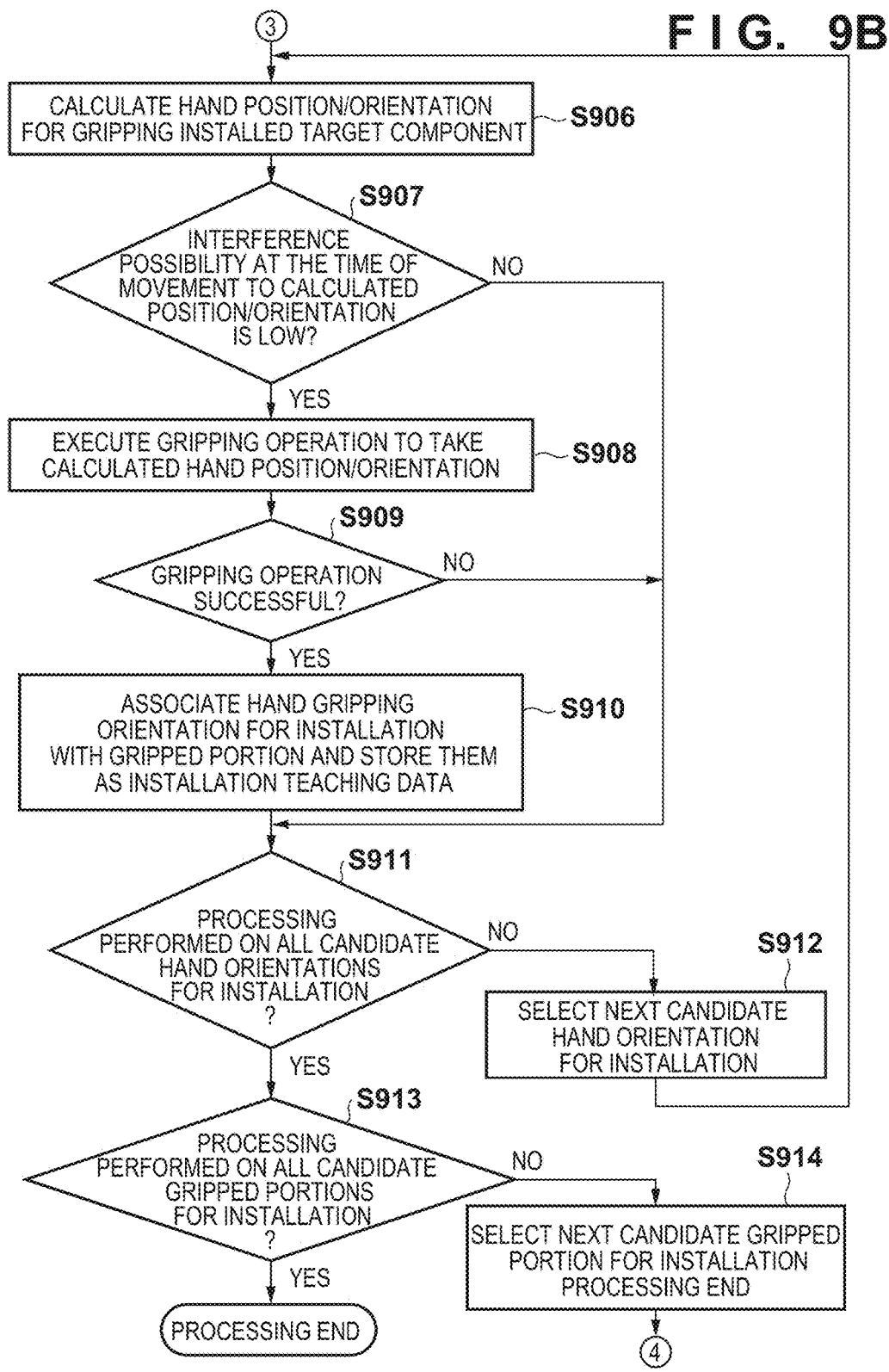

In FIGS. 9A and 9B, the processes of steps S901 to S906 are the same as the steps S501 to S506 in FIGS. 5A and 5B, respectively, and the detailed description thereof will be omitted. Also, the processes of steps S908 to S914 are the same as the processes of steps S507 to S513, respectively.

In step S907, the hand position/orientation candidate calculation unit 112 performs a calculation equivalent to the calculation performed in step S507 with respect to the hand gripping position and orientation for gripping the installation target component 104 in a state of being installed calculated in step S906, and calculates all inter-link angles at the time when the hand eventually comes in the target position and orientation. Those links are arranged in virtual space that is simply modeled on the operation space.

Figure 10:
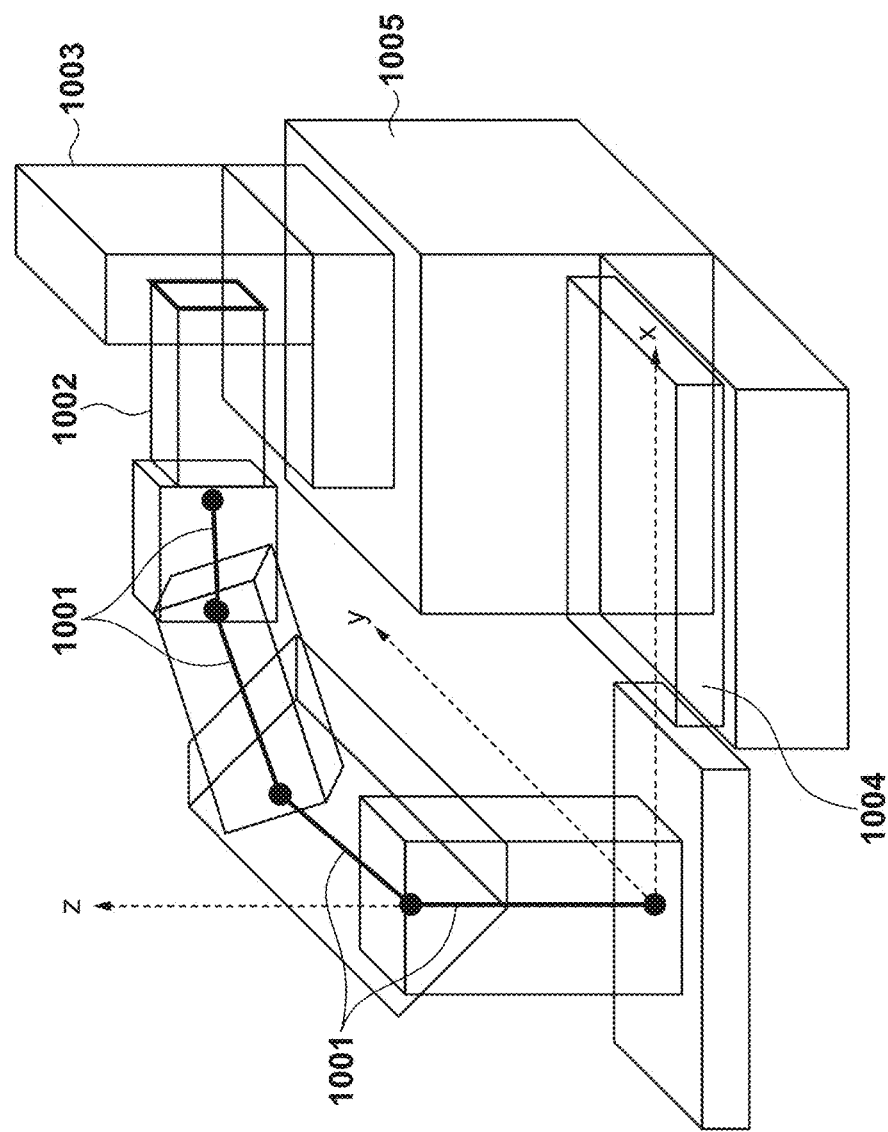
FIG. 10 is a diagram showing an example of virtual space.

FIG. 10 shows an example of the virtual space. The robot arm 101 and the hand mechanism 102 are modeled based on connected links 1001, each link being an axis extending from one joint to the next joint, using cuboids respectively fixed to the links 1001. The connected links have mechanical constraints on the angles therebetween, and possible rotational direction and angles are within a prescribed range. A cuboid fixed to each links, which are a part of the robot arm 101 or the hand mechanism 102 in the actual space, does not cause interference within the range of constraint, and therefore, overlapping of the cuboids corresponding to two connected links in the virtual space is not considered as interference, and is disregarded.

Also, data on the operation environment including the installation target component 1002 in a state of being installed, the installation recipient component 1003 arranged in a prescribed position, the component supply tray 1004, the working table 1005, and the like is modeled using a combination of cuboids fixed in the virtual space.

In step S907, the hand position/orientation candidate calculation unit 112 performs calculation for checking whether or not any one of the cuboids other than the cuboids of the abovementioned two connected links overlap with the space where other cuboids exist in this virtual space. If there is no overlapping, it can be determined that the possibility of interference occurring when the gripping operation is actually performed is low. That is, the hand position/orientation candidate calculation unit 112 determines whether or not the interference possibility at the time of moving toward the calculated position and orientation is low. If it is determined that the interference possibility is low (S907; YES), the processing proceeds to S908. In the processes of step S908 onward, similarly to the first embodiment, it is confirmed that interference does not actually occurred, and the teaching data is obtained. Meanwhile, if it is determined that the interference possibility is high (S907; NO), the robot arm 101 is not driven, and the processing proceeds to step S911.

According to the present embodiment, the possibility that interference occurs when the robot arm is operated can be reduced, and fault tolerance of the robot system is improved.

Third Embodiment

The present invention is able to use not only the sensing units such as the camera device 103 arranged fixedly in the operation environment, but also, for example, a sensing unit attached to the hand or the arm of the robot so that the sensing direction is variable.

Figure 11A:
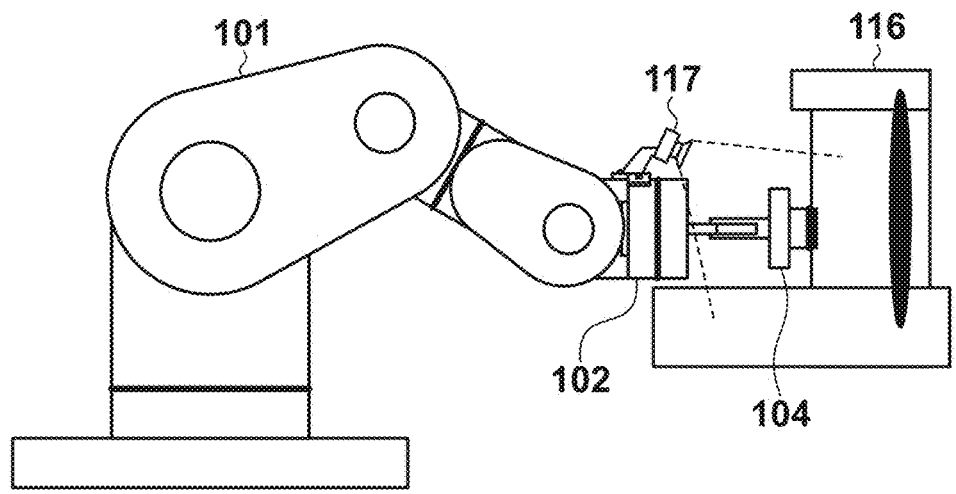
FIGS. 11A and 11B are diagrams showing examples of an on-hand camera and an image of an area including a target component in a state of being installed captured by the on-hand camera, respectively.

FIG. 11A shows the state where an on-hand camera 117 is mounted on the hand mechanism 102 of the robot arm 101 illustrated in FIG. 1. Also in the case of using the on-hand camera 117, the teaching flow described with reference to FIGS. 5A and 5B or FIGS. 9A and 9B is available, and an installation operation can be performed using the installation operation flow in FIG. 6. However, in the present embodiment, an on-hand camera coordinate system is not fixed to the robot coordinate system, but to a hand-link coordinate system. Accordingly, when converting the position and orientation of a component detected from a captured image into those in the robot coordinate system, it is necessary to perform calculation for the links in order. Note that it is of course possible to employ a configuration in which the on-hand camera 117 is attached to a robot other than the robot that performs the gripping and installation operations.

Figure 11B:
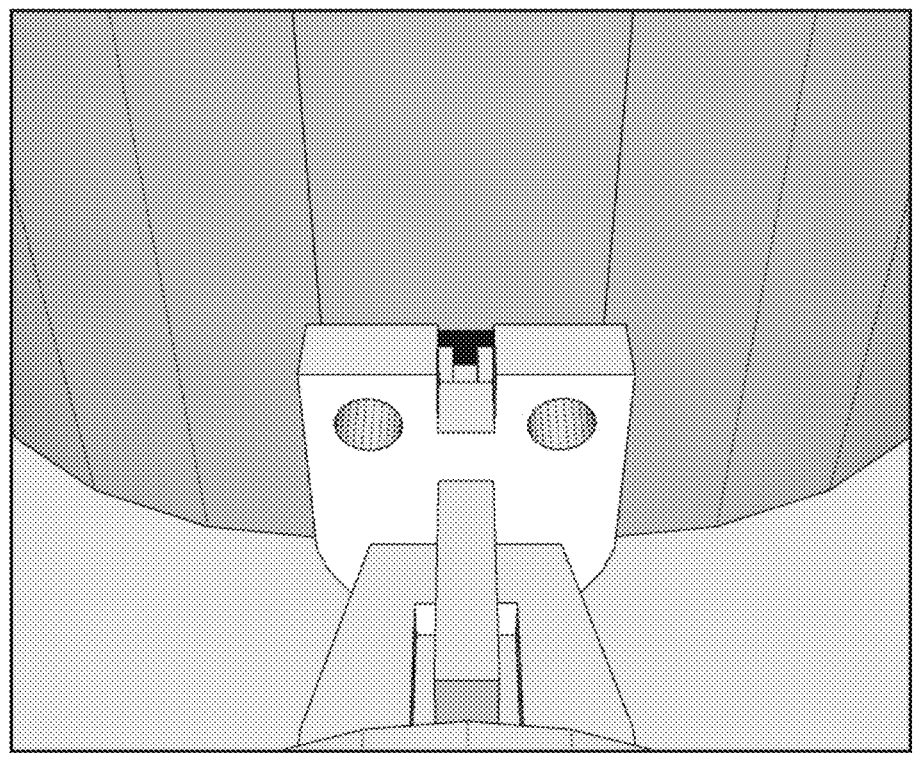

Also, when gripping is successful in step S509 or step S910 and the teaching data is stored, sensing data on an installation completion state can also be obtained by the sensing unit. FIG. 11B shows an example of image data on the installation completion state captured by the on-hand camera 117. By adding this image data to the teaching data and holding it, the image data can be used as data indicating a target state at the time of performing the installation operation.

Further, the above-described component position/orientation detection processing may be performed on the image data on the captured installation completion state. In the installation completion state, the target component is in contact with the hand, and so it is more likely that it is difficult to see the target component than in the state of being installed before being gripped. By performing the component position/orientation detection processing on the captured image data, it can be determined that the gripping orientation corresponding to the image that can be easily detected is the gripping orientation in which the target component can be easily seen, that is, the gripping orientation suitable for the installation operation.

Note that obtaining of the sensing data on the installation completion state may be of course performed by the fixed camera device 103 described in the first embodiment, instead of the on-hand camera. Further, a configuration of using both the fixed camera and the on-hand camera may also be employed. Furthermore, not only cameras but also other sensing units such as a distance measuring sensor may also be used as the on-hand or fixed sensing units.

Fourth Embodiment

It is possible to not only obtain the teaching data on the installation completion state, but also generate teaching data indicating a midway path in each state during the installation operation. The procedure of midway path state teaching data generation processing in the present embodiment will be described with reference to the flowchart in FIGS. 12A and 12B.

Figure 12A:
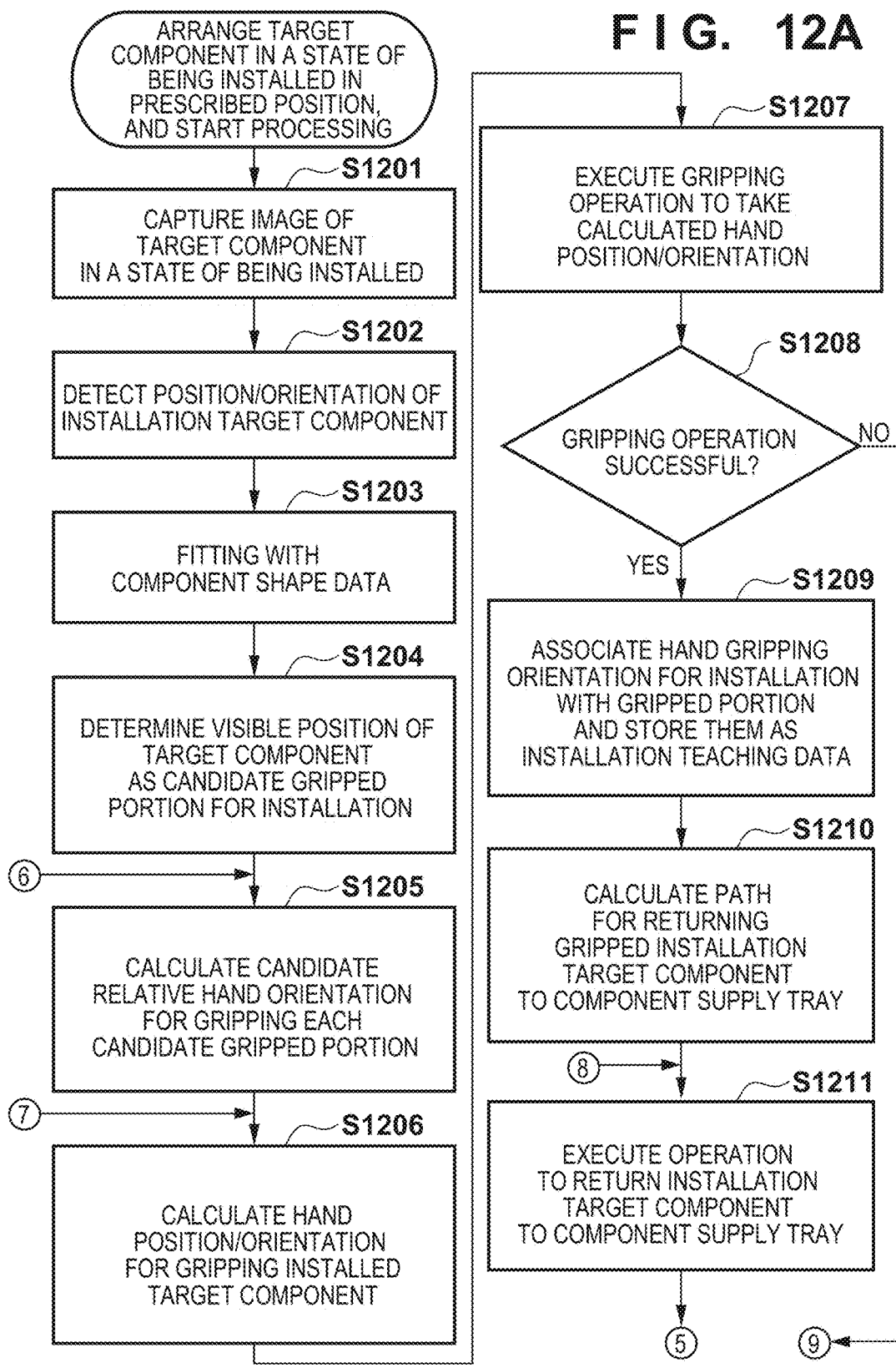
FIGS. 12A and 12B are flowcharts showing a procedure of processing for teaching a midway path in an installation operation according to the fourth embodiment.
Figure 12B:
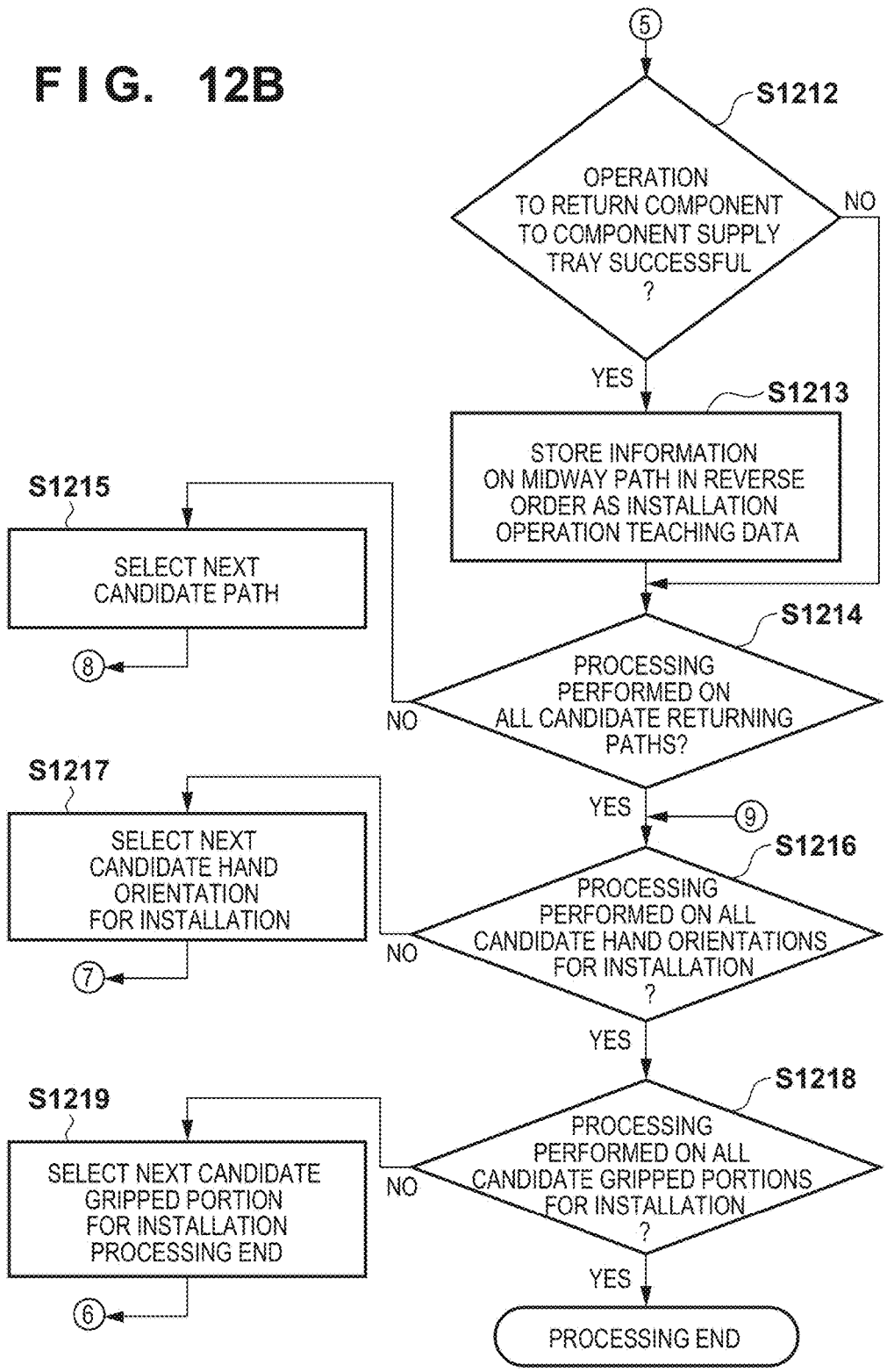

In FIGS. 12A and 12B, the processes in steps S1201 to S1209 are the same as the processes in steps S501 to S509 in FIGS. 5A and 5B, respectively, and the detailed description thereof will be omitted. Also, the processes in steps S1216 to S1219 are the same as the processes in steps S510 to S513, respectively. To the teaching processing flow according to the present embodiment, processes of steps S1210 to S1215 are newly added.

Figure 13A:
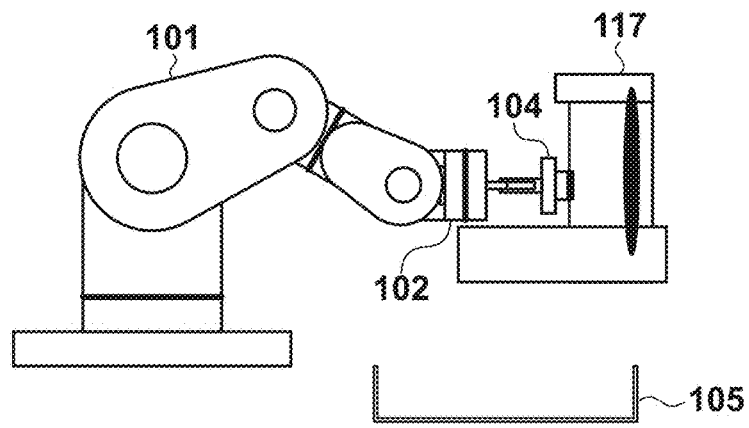
FIGS. 13A to 13C are diagrams showing an example of an operation to return a component in progress.
Figure 13B:
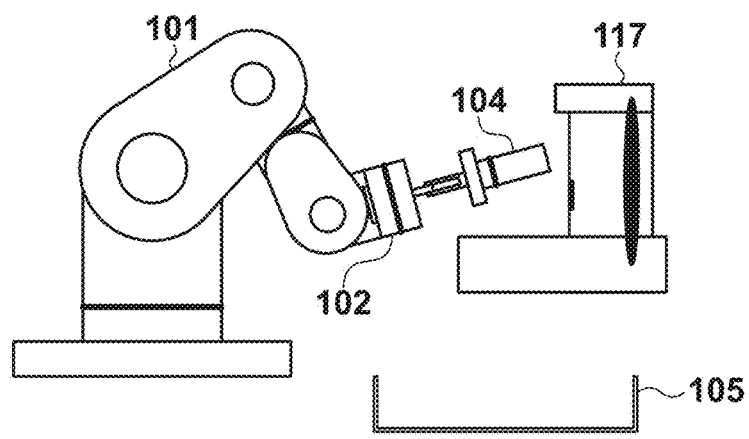
Figure 13C:
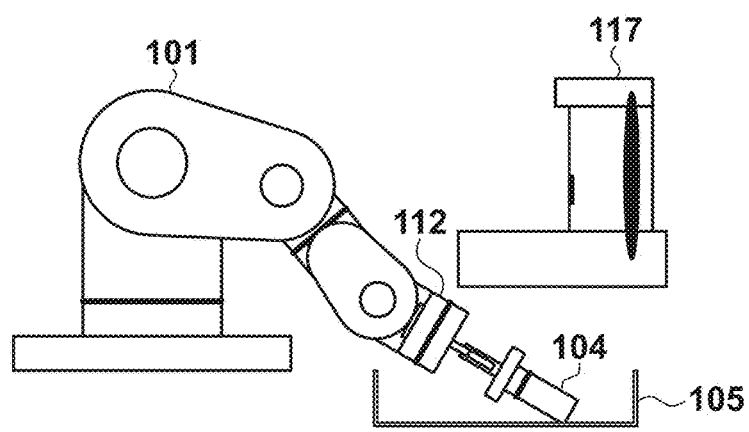

If gripping of the target component in a state of being installed is successful in step S1208 and the teaching data for teaching the installation target state is stored in step S1209, the robot control unit 111, in step S1210, calculates a candidate for a path for an operation to pull out the target component in the state of being installed and return the component to the component supply tray. Usually, there can be several candidates for the path. FIGS. 13A to 13C show the progress states in an operation to return the component being performed according to a candidate path, where the state of the robot is changing from the installation completion state in FIG. 13A to FIGS. 13B and 13C in this order. When calculating a candidate path, the state around the component supply tray 105 shown in FIG. 13C changes in practice in accordance with the position and orientation of the gripped component, and accordingly, for example, it is necessary only to set a position around the center of the component tray as the target position, and no specific target orientation is defined.

Next, in step S1211, the robot control unit 111 selects one candidate path, and execute the operation to return the gripped target component in a state of being installed to the supply tray.

Then, in step S1212, the interference detection unit 115 determines whether or not the operation to return the component to the component supply tray 105 is successful. Here, similarly to step S1208, the interference detection unit 115 determines whether or not any interference has occurred during the operation. If interference has occurred, the subsequent processes are skipped, and the processing proceeds to step S1214.

If no interference has occurred, it is determined that the path can be used at the time of actual installation, and in step S1213, the teaching data storage unit 114 arranges the progress states in the time series change shown in FIGS. 13A to 13C in a reverse order, and stores them as the teaching data for teaching the midway path for the installation operation.

Then, in step S1214, the robot control unit 111 checks whether or not any candidate paths for the returning operation is remaining, advances to step S1215 if remaining, selects the next path, and returns to step S1211. Meanwhile, if not remaining, the processing proceeds to step S1216.

The subsequent processes are the same as the processes in step S510 onward in FIGS. 5A and 5B.

Note that the processes in steps S1210 and S1211 may be performed by user's manual operation using a robot operation accepting unit, which is not shown in the figure. The installation completion state that requires accuracy has been completed by the time of the process in step S1209, and the operation to return the target component in the installed state to the supply tray, which does not usually require such accuracy, can be easily executed even by a manual operation. By the user performing a manual operation while viewing the operation environment, it is possible to suppress occurrence of unnecessary interference and reduce the possibility of system breakdown.

As described above, it is possible to teach not only the installation target state, but also the path information when the assembly robot system performs the operation to install a target component.

The preferred embodiments of the present invention have been described above, but the present invention is not limited to those specific embodiments, and various modifications and changes can be made within the scope of the gist of the present invention described in the scope of the claims. Needless to say, for example, the present invention can be applied as a teaching method for various robot systems such as household robots, as well as production robot systems.

According to the present invention, it is possible to easily teach an assembly robot about an installation operation without need of any special jigs or the like, or complicated specifying operations by a user.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185257, filed Aug. 26, 2011, which is hereby incorporated by reference herein in its entirety.

What is claimed is:

1. An information processing apparatus for generating teaching data for an installation by a robot, comprising:
    a memory; and
    a controller constructed to:
        obtain sensing data of an installation target component installed in a prescribed position on an installation recipient component,
        set a portion of the installation target component as a gripped portion based on the sensing data and model data of the installation target component, wherein the gripped portion is to be held by a hand mechanism of a robot during a holding operation, and wherein the gripped portion is not occluded by the installation recipient component,
        calculate a hand position and orientation of the hand mechanism in which the gripped portion can be held by the hand mechanism,
        store information on the gripped portion and the hand position and orientation in the memory as teaching data, and
        control the robot to perform a holding operation of holding an installation target component with the hand mechanism based on the teaching data stored in the memory.

2. The information processing apparatus according to claim 1, wherein the controller is further constructed to calculate a relative holding orientation of the hand mechanism and the installation target component in which the gripped portion can be held, and
    wherein the teaching data further includes the relative holding orientation.

3. The information processing apparatus according to claim 1,
    wherein the teaching data further includes the sensing data.

4. The information processing apparatus according to claim 1, wherein the control of the robot to perform the holding operation includes controlling driving the hand mechanism and a robot arm connected to the hand mechanism.

5. The apparatus according to claim 4, wherein the controller is further constructed to: detect whether interference with the installation recipient component or an operation environment occurs when the hand mechanism and the robot arm are driven.

6. The information processing apparatus according to claim 1,
    wherein the control of the robot to perform the holding operation includes: controlling driving of the hand mechanism and a robot arm connected to the hand mechanism in conformity with the hand position and orientation stored in memory so as to hold the installation target component in a state of being installed in the prescribed position on the installation recipient component, and
    wherein the controller is further constructed to control driving of the hand mechanism and the robot arm to perform a return operation of returning the installation target component to a component supply tray, and
    wherein the teaching data includes information indicating a reverse order of progress for the robot arm and the hand mechanism in the return operation.

7. The information processing apparatus according to claim 6, wherein the controller is further constructed to receive an instruction indicating a user operation,
    wherein the return operation is executed in accordance with the instruction indicating the user operation.

8. The information processing apparatus according to claim 1, wherein the sensing data comprises image data on an area including the installation target component installed in the prescribed position on the installation recipient component.

9. The information processing apparatus according to claim 1, wherein the sensing data comprises distance information on an area including the installation target component installed in the prescribed position on the installation recipient component.

10. The apparatus according to claim 1, wherein the controller is further constructed to detect at least one of a position or an orientation of the installation target component as a component position/orientation based on the sensing data,
  wherein the gripped portion of the installation target component is also set based on the component position/orientation.

11. The information processing apparatus according to claim 10, wherein the memory is further constructed to store information on a predetermined held portion associated with the model data on the installation target component, and
  wherein the gripped portion of the installation target component is also set based on the information on the predetermined held portion.

12. The information processing apparatus according to claim 10, wherein the hand position and orientation is calculated in a state in which no interference occurs at the time of installation, and
  wherein the controller is further constructed to determine whether interference occurs based on whether model data on the robot arm and the hand mechanism, model data on the installation recipient component, and the model data on the installation target component, overlap.

13. A method for controlling an information processing apparatus for generating teaching data for an installation by a robot, the method comprising the steps of:
  obtaining sensing data of an installation target component installed in a prescribed position on an installation recipient component;
  setting a portion of the installation target component as a gripped portion based on the sensing data and model data of the installation target component, wherein the gripped portion is to be held by a hand mechanism of a robot during a holding operation, and wherein the gripped portion is not occluded by the installation recipient component;
  calculating a hand position and orientation of the hand mechanism in which the gripped portion can be held by the hand mechanism;
  storing information on the gripped portion and the hand position and orientation in a memory as teaching data; and
  controlling the robot to perform a holding operation of holding an installation target component with the hand mechanism based on teaching data stored in the memory.

14. A non-transitory computer-readable storage medium storing a computer program for causing a computer to execute each step of a method for controlling an information processing apparatus for generating teaching data for an installation by a robot, the method comprising the steps of:
  obtaining sensing data of an installation target component installed in a prescribed position on an installation recipient component;
  setting a portion of the installation target component as a gripped portion based on the sensing data and model data of the installation target component, wherein the gripped portion is to be held by a hand mechanism of a robot during a holding operation, and wherein the gripped portion is not occluded by the installation recipient component;
  calculating a hand position and orientation of the hand mechanism in which the gripped portion can be held by the hand mechanism;
  storing information on the gripped portion and the hand position and orientation in a memory as teaching data; and
  controlling the robot to perform a holding operation of holding an installation target component with the hand mechanism based on teaching data stored in the memory.

* * * * *